US012461703B2

(12) United States Patent
Choi et al.

(10) Patent No.: US 12,461,703 B2
(45) Date of Patent: Nov. 4, 2025

(54) ELECTRONIC DEVICE AND OPERATION METHOD THEREOF

(71) Applicant: SAMSUNG ELECTRONICS CO., LTD., Suwon-si (KR)

(72) Inventors: Kilsoo Choi, Suwon-si (KR); Kwansik Yang, Suwon-si (KR); Sehyun Kim, Suwon-si (KR); Jongin Lee, Suwon-si (KR); Hyeeun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 18/110,555

(22) Filed: Feb. 16, 2023

(65) Prior Publication Data

US 2023/0195409 A1  Jun. 22, 2023

Related U.S. Application Data

(63) Continuation of application No. PCT/KR2022/018122, filed on Nov. 16, 2022.

(30) Foreign Application Priority Data

Nov. 16, 2021  (KR) ........................ 10-2021-0158045

(51) Int. Cl.
  *H04R 3/00* (2006.01)
  *G06F 3/16* (2006.01)
  (Continued)

(52) U.S. Cl.
  CPC .............. *G06F 3/162* (2013.01); *H04R 3/00* (2013.01); *H04W 4/80* (2018.02); *H04R 1/1041* (2013.01)

(58) Field of Classification Search
  CPC .......... H04R 3/12; H04R 3/00; H04R 1/1041; H04R 1/105; H04R 2420/07
  (Continued)

(56) References Cited

U.S. PATENT DOCUMENTS 8,861,740 B2 * 10/2014 Parker ................... G06F 9/4418
                                                                381/113
9,420,371 B2      8/2016 An et al.
(Continued)

FOREIGN PATENT DOCUMENTS

CN      105791966 A      7/2016
CN      107277402 A     10/2017
(Continued)

OTHER PUBLICATIONS

PCT/ISA/220; PCT/ISA/210; PCT/ISA/237 dated Feb. 23, 2023 in International Patent Application No. PCT/KR2022/018122.
(Continued)

*Primary Examiner* — Disler Paul
(74) *Attorney, Agent, or Firm* — STAAS & HALSEY LLP

(57) ABSTRACT

An electrode device and an operation method of the same are provided. The electronic device includes a communication interface, a memory to store one or more instructions, and a processor configured to execute the one or more instruction stored in the memory. The processor is configured to identify, based on a wireless connection through the communication interface being released while an audio input operation is being performed, an application corresponding to the audio input operation, select an audio input device from a plurality of audio input devices, which is in an activated state enabled to perform the audio input operation in association with the electronic device, based on the identified application, and perform the audio input operation through the selected audio input device.

7 Claims, 14 Drawing Sheets

(51) Int. Cl.
*H04W 4/80* (2018.01)
*H04R 1/10* (2006.01)

(58) Field of Classification Search
USPC .................... 381/56, 77–80, 74, 122
See application file for complete search history.

(56) References Cited

U.S. PATENT DOCUMENTS

| | | | |
|---|---|---|---|
| 9,439,014 B2* | 9/2016 | Yeh | H04R 29/004 |
| 10,157,039 B2* | 12/2018 | Joshi | H04R 29/004 |
| 10,241,741 B2 | 3/2019 | Laaksonen et al. | |
| 10,390,132 B2 | 8/2019 | Keum et al. | |
| 10,825,480 B2* | 11/2020 | Marco | H04N 9/8205 |
| 12,126,311 B2* | 10/2024 | Magnusson | G10L 25/75 |
| 2007/0242839 A1* | 10/2007 | Kim | H04R 3/00 381/113 |
| 2009/0187967 A1 | 7/2009 | Rostaing et al. | |
| 2014/0294196 A1 | 10/2014 | An et al. | |
| 2015/0045921 A1 | 2/2015 | Stewart et al. | |
| 2015/0054943 A1 | 2/2015 | Zad Issa et al. | |
| 2016/0066091 A1 | 3/2016 | Kum et al. | |
| 2017/0026740 A1 | 1/2017 | Kirsch et al. | |
| 2017/0094511 A1 | 3/2017 | Na et al. | |
| 2020/0233634 A1 | 7/2020 | Seo et al. | |

FOREIGN PATENT DOCUMENTS

| | | |
|---|---|---|
| JP | 2011-061475 A2 | 3/2011 |
| KR | 10-2007-0058924 A | 6/2007 |
| KR | 10-2014-0120195 | 10/2014 |
| KR | 10-1494631 | 2/2015 |
| KR | 10-1552830 B1 | 9/2015 |
| KR | 10-2016-0026585 | 3/2016 |
| KR | 10-1604680 B1 | 3/2016 |
| KR | 10-2016-0045083 | 4/2016 |
| KR | 10-2017-0012121 | 2/2017 |
| KR | 10-2017-0036198 A | 4/2017 |
| KR | 10-1973457 B1 | 4/2019 |
| KR | 10-2035477 | 10/2019 |
| KR | 10-2094392 | 3/2020 |
| KR | 10-2262853 | 6/2021 |

OTHER PUBLICATIONS

Extended European Search Report issued on Oct. 22, 2024 for European Application No. 22896068.8.
European Office Action issued Sep. 11, 2025 for Application No. 22 896 068.8.

* cited by examiner

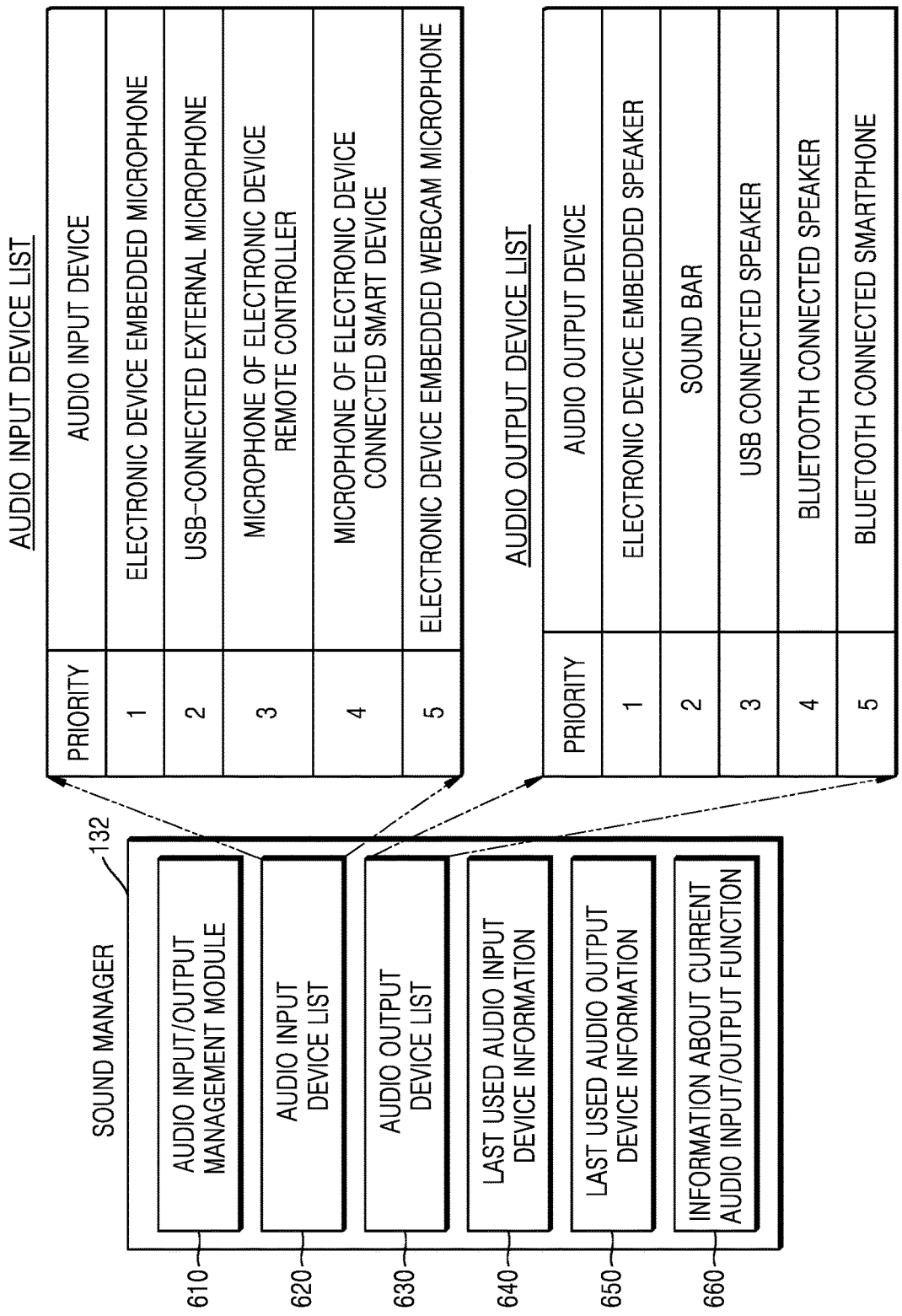

FIG. 12

AUDIO INPUT DEVICE LIST —1210

| PRIORITY | AUDIO INPUT DEVICE | ACTIVATED OR INACTIVATED |
|---|---|---|
| 1 | USB-CONNECTED EXTERNAL MICROPHONE | INACTIVATED |
| 2 | ELECTRONIC DEVICE EMBEDDED MICROPHONE | ACTIVATED |
| 3 | MICROPHONE OF ELECTRONIC DEVICE REMOTE CONTROLLER | ACTIVATED |
| 4 | MICROPHONE OF ELECTRONIC DEVICE CONNECTED SMART DEVICE | ACTIVATED |
| 5 | ELECTRONIC DEVICE EMBEDDED WEBCAM MICROPHONE | INACTIVATED |

AUDIO OUTPUT DEVICE LIST —1220

| PRIORITY | AUDIO OUTPUT DEVICE | ACTIVATED OR INACTIVATED |
|---|---|---|
| 1 | SOUND BAR | INACTIVATED |
| 2 | ELECTRONIC DEVICE EMBEDDED SPEAKER | ACTIVATED |
| 3 | USB CONNECTED SPEAKER | INACTIVATED |
| 4 | BLUETOOTH CONNECTED SPEAKER | ACTIVATED |
| 5 | BLUETOOTH CONNECTED SMARTPHONE | ACTIVATED |

ELECTRONIC DEVICE AND OPERATION METHOD THEREOF

CROSS-REFERENCE TO RELATED APPLICATION

This application is a continuation application, under 35 U.S.C. § 111(a), of international application No. PCT/KR2022/018122, filed on Nov. 16, 2022, which claims priority under 35 U. S. C. § 119 to Korean Patent Application No. 10-2021-0158045, filed on Nov. 16, 2021, the disclosures of which are incorporated herein by reference in their entirety.

BACKGROUND

Field

The disclosure relates to an electronic device and an operation method thereof, and more particularly, to an electronic device for effectively processing an audio input/output, and an operation method of the electronic device.

Description of Related Art

As electronic devices such as televisions become larger and smarter, users not only watch broadcast programs through the electronic devices, but also play games or consume content using various applications.

Various audio input/output devices may be connected to an electronic device by using various communication technologies. Users can use various audio input/output devices such as a Bluetooth headset, a USB connected microphone, and a Bluetooth speaker. When a problem occurs in audio input/output through the audio input/output devices while users are using the audio input/output devices communicatively connected to the electronic device, there is a need to provide an audio input/output function by adaptively selecting an audio input/output device according to a situation or environment in which a user uses the electronic device without interruption of the audio input/output function.

SUMMARY

According to an embodiment of the disclosure, an electronic device includes a communication interface, a memory storing one or more instructions, and a processor configured to execute the one or more instruction stored in the memory. The processor is configured to execute the one or more instructions to, identify, based on a wireless connection through the communication interface being released while an audio input operation is being performed, an application corresponding to the audio input operation, select an audio input device from a plurality of audio input devices, which is in an activated state enabled to perform the audio input operation in association with the electronic device, based on the identified application, and perform the audio input operation through the selected audio input device.

The processor may execute the one or more instructions stored in the memory to identify one or more audio input devices, among the plurality of audio input devices, which are registered in correspondence with a type of the identified application, where the audio input device is selected from among the one or more audio input devices according to a pre-determined priority.

The application corresponding to the audio input operation may be currently running in a foreground among one or more applications currently running in the electronic device.

The processor may execute the one or more instructions stored in the memory to, based on the type of application identified being a karaoke application type, identify one or more audio input devices, among the plurality of audio input devices, which are registered in correspondence with the karaoke application type, where the audio input device is selected as being connected to the electronic device from among the one or more audio input devices according to a set priority corresponding to the karaoke application type.

The processor may execute the one or more instructions stored in the memory to identify a USB-connected microphone, an electronic device embedded microphone, and a camera embedded microphone as the one or more audio input devices registered in correspondence with the karaoke application type, select the USB-connected microphone as the audio input device in preference to the electronic device embedded microphone, and select the electronic device embedded microphone as the audio input device in preference to the camera embedded microphone.

The processor may execute the one or more instructions stored in the memory to, based on the type of application identified being a game application type, identify one or more audio input devices, among the plurality of audio input devices, which are registered in correspondence with the game application type, where the audio input device is selected as being connected to the electronic device from among the one or more audio input devices according to a set priority corresponding to the game application type.

The processor may execute the one or more instructions stored in the memory to identify a USB-connected microphone, an electronic device embedded microphone, and a camera embedded microphone as the one or more audio input devices registered in correspondence with the game application type, select the electronic device embedded microphone as the audio input device in preference to the USB-connected microphone, and select the USB-connected microphone as the audio input device in preference to the camera embedded microphone.

The processor may execute the one or more instructions stored in the memory to, based on the type of application identified being a video call application type, identify one or more audio input devices, among the plurality of audio input devices, which are registered in correspondence with the video call application type, where the audio input device is selected as being connected to the electronic device from the one or more audio input devices according to a set priority corresponding to the video call application type.

The processor may execute the one or more instructions stored in the memory to select a camera embedded microphone as the audio input device in preference to an electronic device embedded microphone and select the electronic device embedded microphone as the audio input device in preference to a USB-connected microphone.

According to another embodiment of the disclosure, an operation method of an electronic device includes, identifying, based on a wireless connection being released while an audio input operation is being performed, an application corresponding to the audio input operation, selecting an audio input device from a plurality of audio input devices which is in an activated state enabled to perform the audio input operation in association with the electronic device, based on the identified application, and performing the audio input operation through the selected audio input device.

According to another embodiment of the disclosure, a non-transitory computer-readable recording medium has recorded thereon one or more programs executable by a processor of an electronic device to implement an operation method of the electronic device. The operation method of the electronic device including, identifying, based on a wireless connection being release while an audio input operation is being performed, an application corresponding to the audio input operation, selecting an audio input device from a plurality of audio input devices, which is in an activated state enabled to perform the audio input operation in association with the electronic device, based on the identified application, and performing the audio input operation through the selected audio input device.

BRIEF DESCRIPTION OF DRAWINGS

This disclosure may be readily understood by reference to the following detailed description and the accompanying drawings, in which reference numerals refer to structural elements.

FIG. 11 illustrates an example of a prioritized audio input device list and an example of a prioritized audio output device list, according to an embodiment of the disclosure.

FIG. 12 illustrates an embodiment in which an audio input device list and an audio output device list further include information indicating whether each device is activated, according to an embodiment of the disclosure.

DETAILED DESCRIPTION OF EXEMPLARY EMBODIMENTS

Figure 1:
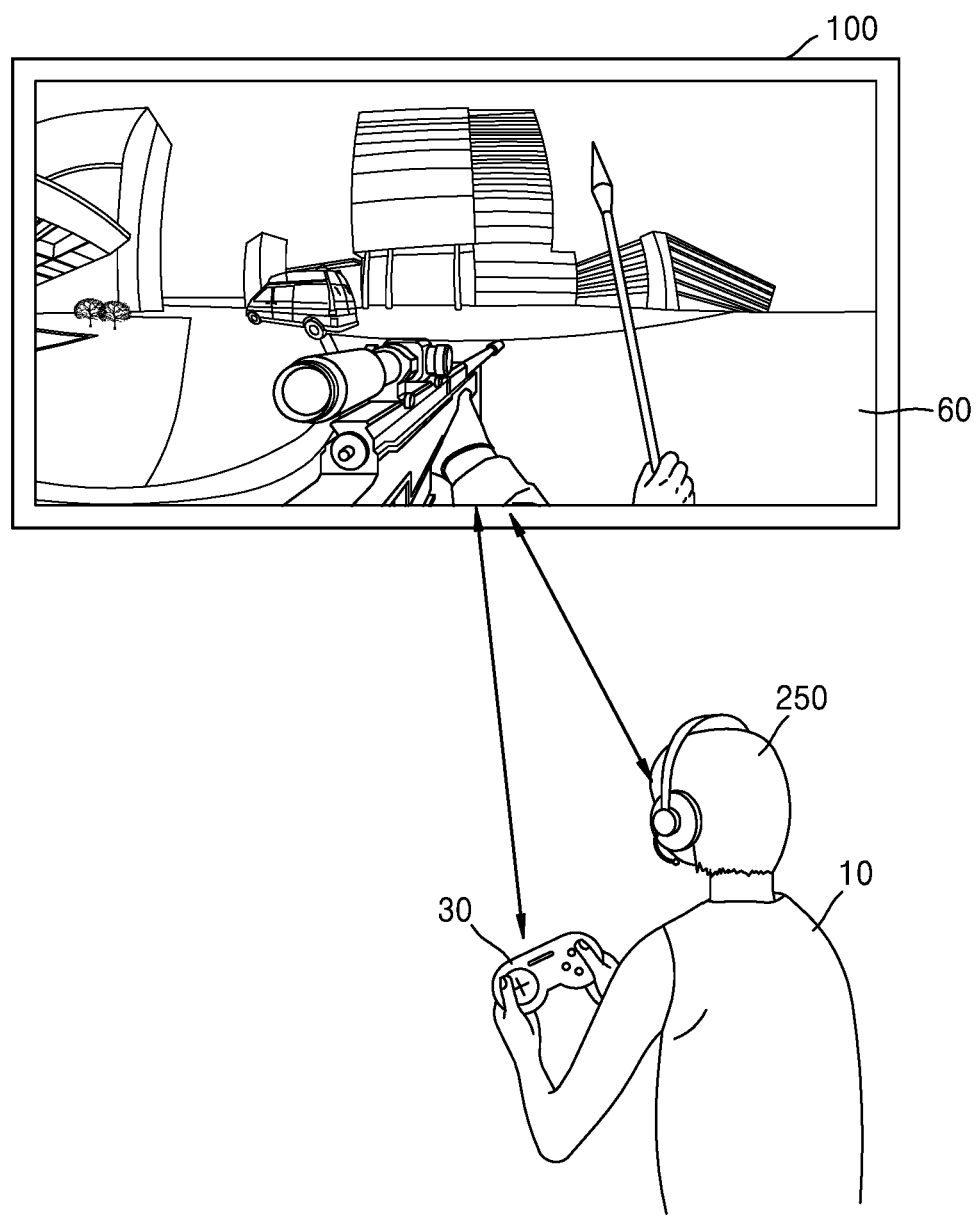
FIG. 1 is a reference diagram for explaining a type in which an audio input/output operation is performed by using an audio input/output device connected to an electronic device such as a TV, through a communication, according to the related art.

Throughout the disclosure, the expression "at least one of a, b or c" indicates only a, only b, only c, both a and b, both a and c, both b and c, all of a, b, and c, or variations thereof.

Terms used herein will be described briefly, and the present invention will be described in detail.

Although general terms widely used at present were selected for describing the present disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description of the disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

The disclosure will now be described more fully with reference to the accompanying drawings, in which exemplary embodiments of the disclosure are shown. The disclosure may, however, be embodied in many different forms and should not be construed as being limited to the embodiments set forth herein. In the drawings, parts irrelevant to the description are omitted for the simplicity of explanation, and like numbers refer to like elements throughout.

The term "user" used herein denotes a person who controls a function or operation of a computing device or an electronic device by using a control device. Examples of the user may include a viewer, a manager, or an installation engineer.

Provided are an electronic device having an audio input/output function by adaptively selecting an audio input/output device according to a situation or environment in which a user uses the electronic device, without interruption of the audio input/output function, when a problem occurs in audio input/output through an audio input/output device currently being used, and an operation method of the electronic device.

According to various embodiments of the disclosure, when a wirelessly connected audio input/output device is disconnected and a new audio input/output device is selected, a replacement audio input/output device is adaptively selected in consideration of the situation of an application being executed in the electronic device, thereby providing an audio input/output function to a user through an audio input/output device that is more appropriate for a use situation.

FIG. 1 is a reference diagram for explaining a type in which an audio input/output operation is performed by using an audio input/output device connected to an electronic device such as a TV, through a communication, according to the related art.

Referring to FIG. 1, an electronic device 100 may display various image contents on a display. Examples of the various image contents may include broadcast programs, movies, game contents, and various application execution screen images. FIG. 1 illustrates an example in which the electronic device 100 displays a game content 60 by executing a game application. The game application executed by the electronic device 100 may provide a voice call function. When a user 10 uses the voice call function, the electronic device 100 may receive an audio input corresponding to a voice call of the user through the microphone of a Bluetooth headset worn by the user.

The electronic device 100 may receive audio inputs by using applications that provide various audio input functions. For example, when a karaoke application is executed in the electronic device 100, the electronic device 100 may receive an audio input corresponding to a singing sound of the user. For example, when a game application is executed in the electronic device 100, the electronic device 100 may receive an audio input corresponding to a voice call of the user according to execution of a voice call function provided by the game application. For example, when a voice call application is executed in the electronic device 100, the electronic device 100 may receive an audio input corresponding to a voice call of the user.

The electronic device 100 may receive audio inputs by using various audio input devices. For example, the electronic device 100 may receive an audio input by using one or more audio input devices built in the electronic device 100 or one or more audio input devices connected to the electronic device 100 via wired and/or wireless communication. The one or more audio input devices built in the electronic device 100 may include a microphone built in the electronic device 100 or a microphone included in a camera built in the electronic device 100. The one or more audio input devices connected to the electronic device 100 via wired communication may include a microphone connected to the electronic device 100 via a USB or a microphone included in a camera connected to the electronic device 100 via a USB. The one or more audio input devices connected to the electronic device 100 via wireless communication may include the microphone of a smartphone connected to the electronic device 100 via short-range communication or the microphone included in a remote controller connected to the electronic device 100 via short-range communication.

When one of various audio input devices is no longer operated for some reason while the electronic device 100 is performing an audio input operation by using the audio input device, the audio input operation is no longer performed. For example, because a wirelessly connected audio input device no longer operates due to its power supply discharge or occurrence of a problem, wireless communication connection between the audio input device and the electronic device 100 may be released, and thus the electronic device 100 may not be able to receive an audio input signal from the audio input device.

When an audio input operation through an existing audio input device is interrupted as described above and a user is made to find a new audio input device and manually perform a connection operation, search and connection of a new audio input device may take a lot of time and may cause user inconvenience. Accordingly, various embodiments of the disclosure provide an electronic device capable of adaptively selecting an audio input device according to a situation of performing an audio input operation and receiving an audio input by using the selected audio input device, when wireless connection of an audio input device having already performed an audio input operation is released.

According to various embodiments, when wireless connection of an audio input device that has already performed an audio input operation is released, the electronic device 100 may select a new audio input device that is to replace the existing audio input device from among a plurality of audio input devices according to the type of application related to the audio input operation. In detail, an appropriate audio input device may vary according to the type of application of performing a current audio input operation in the electronic device 100. For example when the type of application currently being executed by the electronic device 100 is a game application type, the microphone built in the electronic device 100 may be more appropriate as the new audio input device than the microphone included in the camera. In the case of a voice call function through a game application, when the microphone built in the camera is used even though only a voice call is necessary, not only the microphone but also the camera may operate, and thus a camera operation that may not be wanted by the user may occur. In the case of a video call application, the camera is already in operation to capture the user's image, and thus it may be efficient to use the microphone included in the camera. In the case of a karaoke application, when a microphone connected via a USB exists, the microphone connected via a USB may be suitable as an audio input device for receiving the user's song sound. However, these examples mean that a suitable audio input device may vary depending on the type of application for performing an audio input operation, and should not be construed as meaning that a specific audio input device is most suitable for a specific application.

According to various embodiments, when wireless connection of an audio input device having already performed an audio input operation is released, the electronic device 100 may identify the type of application having already executed the audio input operation, identify one or more audio input devices registered in correspondence with the identified application type, select an audio input device from the registered one or more audio input devices, and perform an audio input operation by using the selected audio input device.

According to various embodiments, the electronic device 100 may register one or more audio input devices in correspondence with an application type, and may prioritize the registered one or more audio input devices.

According to various embodiments, when wireless connection of an audio input device performing an audio input operation is released, the electronic device 100 may identify the type of application executing the audio input operation, and select an audio input device having a high priority from among one or more audio input devices registered in correspondence with the identified application type, thereby performing an audio input operation through a replacement audio input device which is optimal for a situation where a current audio input operation is performed.

Figure 2:
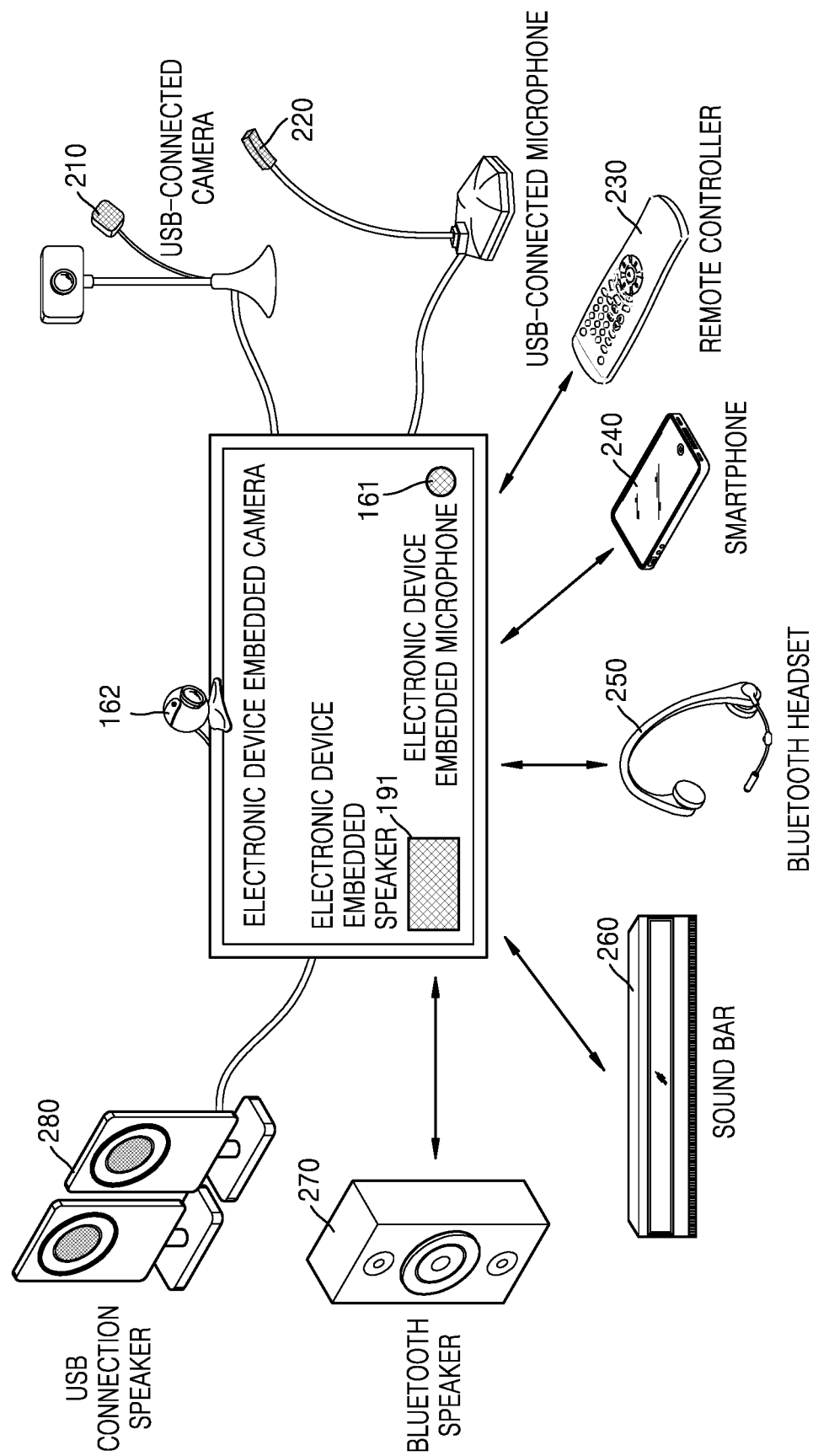
FIG. 2 is a reference diagram for explaining examples of various audio input/output devices that may be connected to an electronic device according to an embodiment of the disclosure.

FIG. 2 is a reference diagram for explaining examples of various audio input/output devices that may be connected to an electronic device according to an embodiment of the disclosure.

Referring to FIG. 2, according to an embodiment, the electronic device 100 may include at least one of an electronic device embedded speaker 191, an electronic device embedded microphone 161, or an electronic device embedded camera 162. The electronic device embedded camera 162 may include a microphone.

The electronic device 100 may be connected to various audio input/output devices by using various communication protocols.

According to an embodiment, the electronic device 100 may be connected to a USB-connected camera 210 capable of communication connection using a USB communication protocol to receive an image captured by the USB-connected camera 210. The USB-connected camera 210 may include a microphone or a speaker.

According to an embodiment, the electronic device 100 may be connected to a USB-connected microphone 220 capable of communication connection using a USB communication protocol, to thereby receive voice data obtained by the USB-connected microphone 220. The USB-connected microphone 220 may include a speaker.

According to an embodiment, the electronic device 100 may receive a voice from a remote controller 230 including a microphone.

According to an embodiment, the electronic device 100 may be connected to a smartphone 240 capable of communication connection using a Wi-Fi communication protocol or a Bluetooth communication protocol to thereby receive voice data or image data obtained by the smartphone 240.

According to an embodiment, the electronic device 100 may be connected to a controller 30, a Bluetooth headset 250 capable of communication connection by using the Bluetooth communication protocol to thereby output a voice or audio data to a Bluetooth headset 250 or receive voice data obtained by the Bluetooth headset 250.

According to an embodiment, the electronic device 100 may be connected to a sound bar 260 capable of communication connection by using the Bluetooth communication protocol to thereby output a voice or audio data to the sound bar 260.

According to an embodiment, the electronic device 100 may be connected to a Bluetooth speaker 270 capable of communication connection by using the Bluetooth communication protocol to thereby output a voice or audio data to the Bluetooth speaker 270.

According to an embodiment, the electronic device 100 may be connected to a USB connection speaker 280 capable of communication connection by using the USB communication protocol to thereby output a voice or audio data to the USB connection speaker 280.

According to an embodiment, the electronic device 100 may receive an audio input by using one or more audio input devices built in the electronic device 100 or one or more audio input devices connected to the electronic device 100 via communication, as shown in FIG. 2.

According to an embodiment, the electronic device 100 may map the one or more audio input devices in correspondence with the type of application including an audio input operation function. The electronic device 100 may prioritize the one or more audio input devices mapped in correspondence with the type of application.

According to an embodiment, when wireless connection of an audio input device performing a current audio input operation is released, the electronic device 100 may select a new audio input device that is to replace the existing audio input device of which wireless connection has been released, and thus may perform an audio input operation without any discontinuity.

According to an embodiment, the electronic device 100 may identify the type of application related to the current audio input operation, identify an activated audio input device as one or more audio input devices mapped in correspondence with the identified application type, and select one audio input device from among the identified one or more audio input devices.

According to an embodiment, the electronic device 100 may select an audio input device having a high priority from among the identified one or more audio input devices according to priorities, and may perform an audio input operation by using the selected audio input device.

Figure 3:
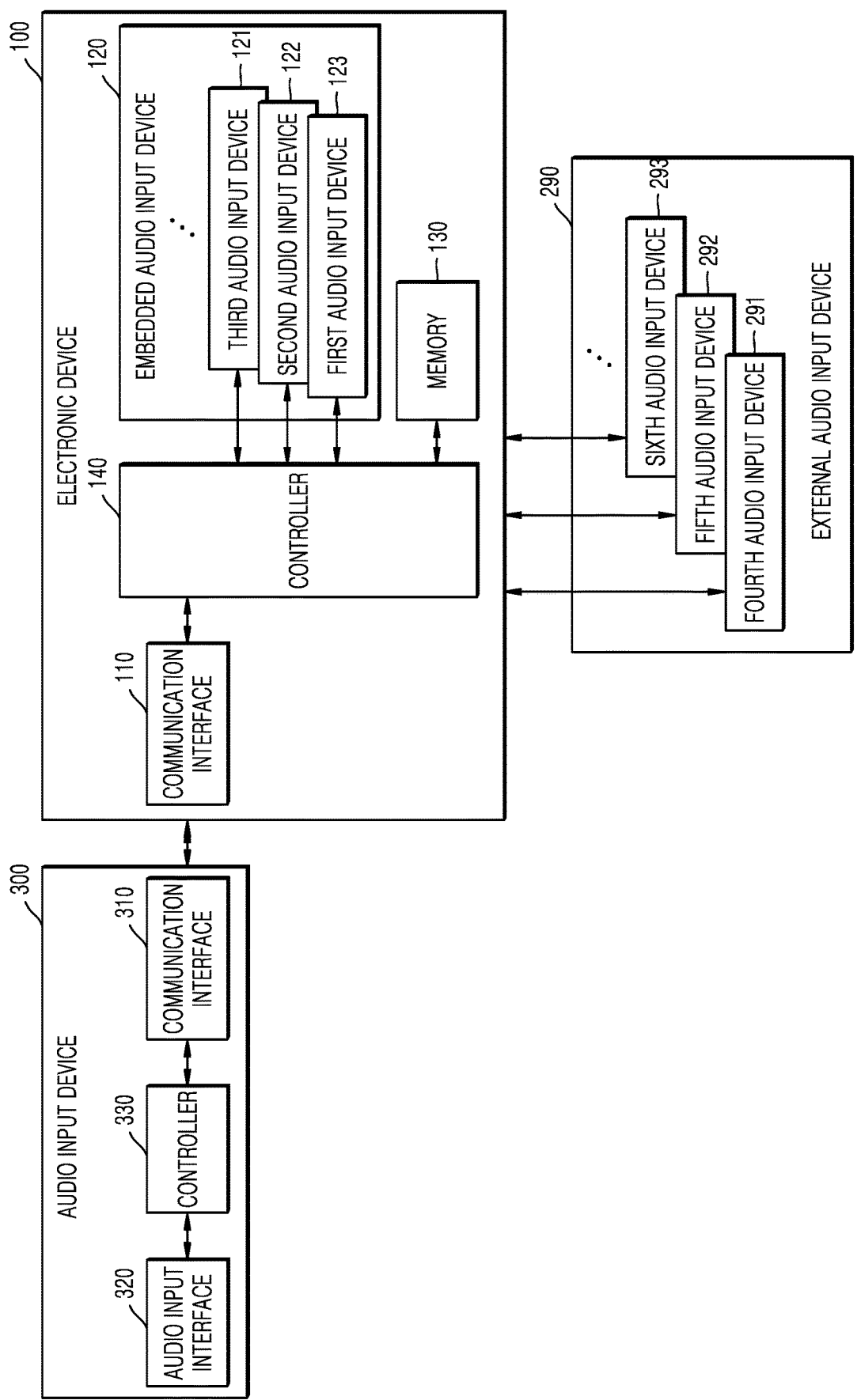
FIG. 3 is a schematic block diagram of an electronic device and an audio input device according to an embodiment of the disclosure.

FIG. 3 is a schematic block diagram of an electronic device and an audio input device according to an embodiment of the disclosure.

Referring to FIG. 3, the electronic device 100 and an audio input device 300 may be connected to each other via a wireless communication protocol. The audio input device 300 may transmit audio input data to the electronic device 100 via wireless communication.

The audio input device 300 may include a communication interface 310, an audio input interface 320, and a controller 330.

The communication interface 310 may transmit the audio input data to the electronic device 100 by communicating with a communication interface 110 of the electronic device 100. The communication interface 310 may be connected to the communication interface 110 of the electronic device 100 by using short-range wireless communication technology such as Bluetooth or Wi-Fi.

The audio input interface 320 may receive the audio input data including a voice of a user, and may transmit the audio input data to the communication interface 310 via the controller 330.

The controller 330 may entirely control the components of the audio input device 300.

According to an embodiment, the controller 330 may control the audio input interface 320 to receive audio input data including a voice of the user, and may control the communication interface 310 to transmit the audio input data received from the audio input interface 320 to the electronic device 100. For example, when the electronic device 100 executes a game application, the controller 330 may control the communication interface 310 to transmit audio input data corresponding to a voice call of the user to the electronic device 100 according to execution of a voice call function included as a function of the game application. For example, when the electronic device 100 executes a video call application, the controller 330 may control the communication interface 310 to transmit audio input data corresponding to a voice call of the user to the electronic device 100 according to execution of a video call function. For example, when the electronic device 100 executes a karaoke application, the controller 330 may control the communication interface 310 to transmit audio input data corresponding to a singing sound of the user to the electronic device 100.

The electronic device 100 may receive the audio input data from the audio input device 300 via wireless communication. The electronic device 100 may also be referred to as a display device, a computing device, or a multimedia device.

The electronic device 100 may include the communication interface 110, an embedded audio input device 120, a memory 130, and a controller 140. The electronic device 100 may be connected to an external audio input device 290.

The electronic device 100 may represent a device capable of displaying image content, video content, game content, graphic content, and the like by including a display. The electronic device 100 may output or display an image or content received from an external input device or a server computer. Examples of the electronic device 100 may include various types of electronic devices capable of receiving and outputting content, such as a network TV, a smart TV, an Internet TV, a web TV, an IPTV, and a PC. The electronic device 100 may be referred to as an electronic device in terms of receiving and displaying content, and may also be referred to as a content receiving device, a multimedia device, a display device, a computing device, or the like.

The communication interface 110 may include one or more modules that enable wireless communication between the electronic device 100 and a wireless communication system or between the electronic device 100 and a network in which another electronic device is located.

According to an embodiment, the communication interface 110 may be connected to the audio input device 300 and the external audio input device 290 according to a wired and/or wireless communication protocol to receive the audio input data.

According to an embodiment, the communication interface 110 may be connected to an external electronic device or a server computer according to an Internet communication protocol to transmit audio input data corresponding to a voice call or a video call to the external electronic device or the server computer.

The embedded audio input device 120 may receive an audio input from an external source. The embedded audio input device 120 may include one or more audio input devices. For example, FIG. 3 illustrates an embodiment in which the embedded audio input device 120 includes a first audio input device 121, a second audio input device 122, and a third audio input device 123. The embedded audio input device 120 may include, for example, a microphone or a camera microphone.

The electronic device 100 may be connected to the external audio input device 290 by using a wired and/or wireless communication protocol. The external audio input device 290 may include one or more audio input devices. FIG. 3 illustrates an embodiment in which the external audio input device 290 includes a fourth audio input device 291, a fifth audio input device 292, and a sixth audio input device 293. The external audio input device 290 may include, for example, a USB-connected microphone, a Bluetooth headset, the microphone of a smartphone, the microphone of a remote controller, and the like.

The memory 130 may store a program related to an operation of the electronic device 100 and various pieces of data generated during the operation of the electronic device 100.

The processor 210 may control the overall operation of the electronic device 100 by executing one or more programs stored in the memory 130.

According to an embodiment, the controller 140 may execute the one or more instructions stored in the memory 130 to, as wireless connection of the audio input device 300 performing an audio input operation is released, identify an application corresponding to the audio input operation, select an audio input device from a plurality of audio input devices activated in the electronic device 100, based on the identified application, and perform the audio input operation through the selected audio input device. For example, in FIG. 3, the controller 140 may select one audio input device from activated audio input devices from among the first audio input device 121, the second audio input device 122, and the third audio input device 123 included in the embedded audio input device 120 and the fourth audio input device 291, the fifth audio input device 292, and the sixth audio input device 293 included in the external audio input device 290.

According to an embodiment, the controller 140 may execute the one or more instructions stored in the memory 130 to identify one or more audio input devices registered in correspondence with the identified application type and select the one audio input device from among the one or more audio input devices according to a pre-determined priority. For example, in FIG. 3, when a first audio input device, a second audio input device, and a fourth audio input device have been registered in correspondence with the identified application type, the controller 140 may select one audio input device from among the registered audio input devices according to the pre-determined priority.

According to an embodiment, the controller 140 may execute the one or more instructions stored in the memory 130 to, as the type of application is identified as a karaoke application type, identify one or more audio input devices registered in correspondence with the karaoke application type, and select one audio input device connected to the electronic device 100 from among the one or more audio input devices according to a set priority corresponding to the karaoke application type.

According to an embodiment, the controller 140 may execute the one or more instructions stored in the memory 130 to identify a USB-connected microphone, an electronic device embedded microphone, and a camera embedded microphone as the one or more audio input devices registered in correspondence with the karaoke application type, select the USB-connected microphone in preference to the electronic device embedded microphone, and select the electronic device embedded microphone in preference to the camera embedded microphone.

According to an embodiment, the controller 140 may execute the one or more instructions stored in the memory 130 to, as the type of application is identified as a game application type, identify one or more audio input devices registered in correspondence with the game application type, and select one audio input device connected to the electronic device 100 from the one or more audio input devices according to a set priority corresponding to the game application type.

According to an embodiment, the controller 140 may execute the one or more instructions stored in the memory 130 to identify a USB-connected microphone, an electronic device embedded microphone, and a camera embedded microphone as the one or more audio input devices registered in correspondence with the game application type, select the electronic device embedded microphone in preference to the USB-connected microphone, and select the USB-connected microphone in preference to the camera embedded microphone.

According to an embodiment, the controller 140 may execute the one or more instructions stored in the memory 130 to, as the type of application is identified as a video call application type, identify one or more audio input devices registered in correspondence with the video call application type, and select one audio input device connected to the electronic device 100 from the one or more audio input devices according to a set priority corresponding to the video call application type.

According to an embodiment, the controller 140 may execute the one or more instructions stored in the memory 130 to select the camera embedded microphone in preference to the electronic device embedded microphone and select the electronic device embedded microphone in preference to the USB-connected microphone. According to an embodiment, the controller 140 may execute the one or more instructions stored in the memory 130 to select a most recently used audio output device as the replacement audio output device from the plurality of audio output devices.

According to an embodiment, the controller 140 may execute the one or more instructions stored in the memory 130 to select as the replacement audio output device an audio output device determined from the plurality of audio output devices according to a pre-determined priority.

According to an embodiment, the controller 140 may execute the one or more instructions stored in the memory 130 to select, as the replacement audio output device, an audio output device determined from the plurality of audio output devices according to not only the pre-determined priority but also whether the plurality of audio output devices are activated.

According to an embodiment, the controller 140 may execute the one or more instructions to, as it is determined that the video call operation is not being executed, select the replacement audio input device and the replacement audio output device according to a pre-determined priority. A voice input device included in a camera may be excluded from the audio input device selection.

According to an embodiment, the controller 140 may execute the one or more instructions to automatically provide a graphic user interface capable of gradually increasing the volume of an audio output or adjust the sound volume of an audio output through the selected audio output device, when an audio output operation is performed through the selected replacement audio output device.

Figure 4:
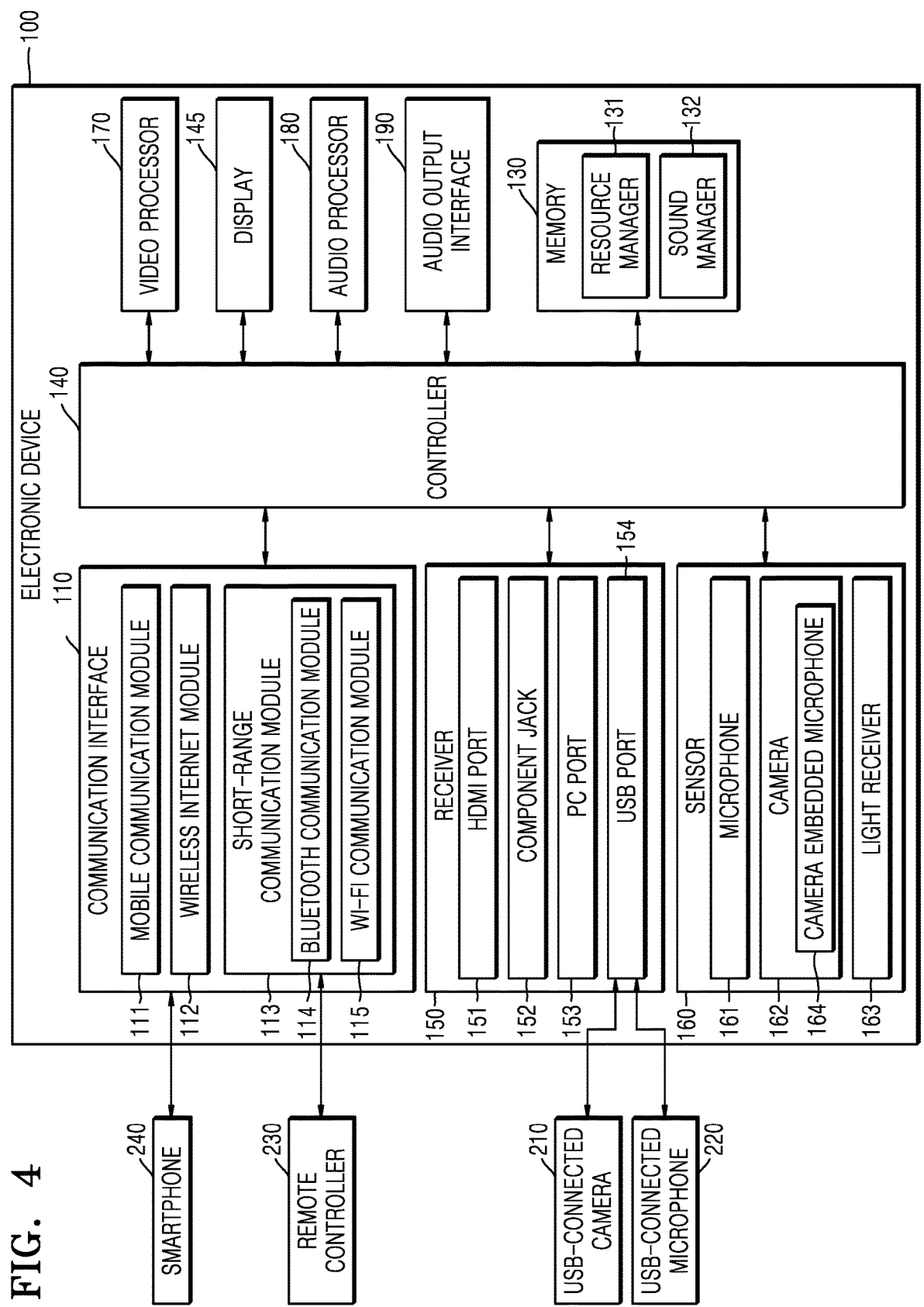
FIG. 4 is a detailed block diagram of the electronic device according to an embodiment of the disclosure.

FIG. 4 is a detailed block diagram of the electronic device 100 according to an embodiment of the disclosure.

Referring to FIG. 4, the image electronic device 100 may include a communication interface 110, a memory 130, a controller 140, a display 145, a receiver 150, a sensor 160, a video processor 170, an audio processor 180, and an audio output interface 190.

The communication interface 110 may include one or more modules that enable wireless communication between the electronic device 100 and a wireless communication system or between the electronic device 100 and a network in which another electronic device is located. For example, the communication interface 110 may include a mobile communication module 111, a wireless Internet module 112, and a short-range communication module 113.

The mobile communication module 111 transmits or receives a wireless signal to or from at least one of a base station, an external terminal, or a server on a mobile communication network. Examples of the wireless signal may include a voice call signal, a video call signal, or various types of data according to text/multimedia message exchange.

The wireless Internet module 112 is referred to as a wireless Internet access module, and may be built in a device or installed outside the device. Wireless LAN (WLAN) (WiFi), wireless broadband (Wibro), World Interoperability for Microwave Access (Wimax), High Speed Downlink Packet Access (HSDPA), etc. may be used as wireless Internet technologies.

The short-distance communication module 113 denotes a module for short-distance communication. Bluetooth, Bluetooth Low Energy (BLE), Radio Frequency Identification (RFID), Infrared Data Association (IrDA), Ultra Wideband (UWB), ZigBee, etc. may be used as short-distance communication technologies. For example, the short-range communication module 113 may include a Bluetooth communication module 114 and a Wi-Fi communication module 115.

The receiver 120 may receive an image signal and an audio signal received from an external input device according to a connected protocol under a control by the controller 140, and may output the image signal and the audio signal to the video processor 170 and the audio processor 180.

The receiver 150 may receive video (for example, a moving picture), audio (for example, a voice or music), and additional information (for example, an EPG) from outside the electronic device 100 under the control by the controller 140. The receiver 150 may include a High-Definition Multimedia Interface (HDMI) port 151, a component jack 152, a personal computer (PC) port 153, or a universal serial bus (USB) port 154, or may include a combination of one or more of the aforementioned ports. The receiver 150 may further include a DisplayPort (DP), a Thunderbolt, and a Mobile High-Definition Link (MHL) in addition to the HDMI port.

According to an embodiment, the USB port 154 may be connected to the USB-connected camera 210 or the USB-connected microphone 220, and may receive audio input data from a microphone included in the USB-connected camera 210 or the USB-connected microphone 220. The sensor 160 may sense a voice of a user, an image of the user, or an interaction with the user, and may include a microphone 161, a camera 162, and a light receiver 163.

The microphone 161 receives an uttered voice of the user. The microphone 161 may convert the received voice into an electrical signal and output the electrical signal to the controller 140.

The camera 162 may receive an image (for example, consecutive frames) corresponding to a motion of the user including a gesture within a recognition range of the camera 162.

According to an embodiment, when a video call application is being executed in the electronic device 100, the camera 162 may capture and obtain a user's image, and transmit the obtained user's image to the controller 140. The camera 162 may include a camera embedded microphone 164 inside the camera 162 separately from the microphone 161.

The light receiver 163 receives an optical signal (including a control signal) from a remote control device. The light receiver 163 may receive an optical signal corresponding to a user input (for example, touch, pressing, a touch gesture, a voice, or a motion) from the remote control device. A control signal may be extracted from the received optical signal under the control by the controller 140.

The video processor 170 may process the image signal received from the receiver 150 or the communication interface 110 and output a processed image signal to the display 140, under the control by the controller 140.

The display 145 may display the image signal received from the video processor 170 on the screen.

The audio processor 180 may convert the audio signal received from the receiver 150 or the communication interface 110 into an analog audio signal and output the analog audio signal to the audio output interface 190, under the control by the controller 140.

The audio output interface 190 may output the received analog audio signal through a speaker.

The memory 130 may store a program related to an operation of the electronic device 100 and various pieces of data generated during the operation of the electronic device 100.

According to an embodiment, the memory 130 may include a resource manager 131 managing information about an process or program activated by the electronic device 100, and a sound manager 132 managing an audio input/output function of the electronic device 100.

Figure 5:
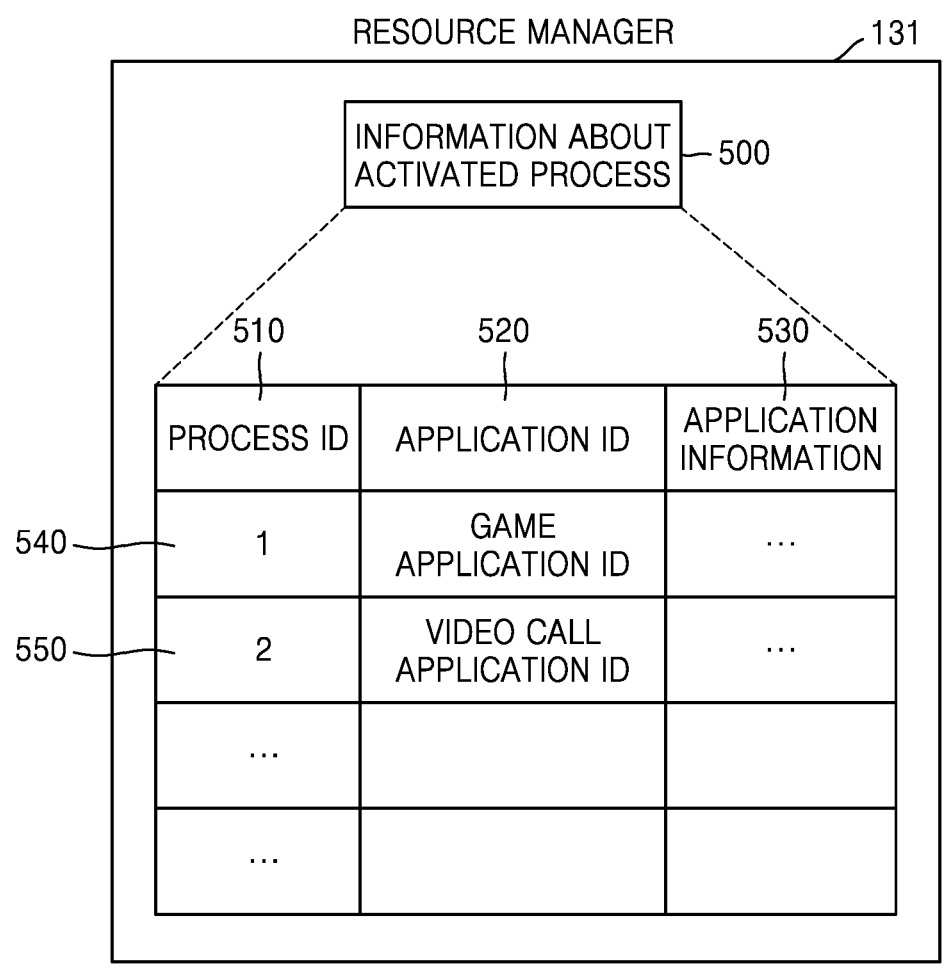
FIG. 5 is a view illustrating an example of a resource manager according to an embodiment of the disclosure.

FIG. 5 is a view illustrating an example of a resource manager according to an embodiment of the disclosure.

Referring to FIG. 5, the resource manager 131 may include information 500 about an activated process. The information 500 about an activated process may include information about one or more processes activated by the electronic device 100. The information 500 about the activated process may include a process ID 510, an application ID 520 indicating the identifier of an application corresponding to a process, and application information 530 indicating information about the application corresponding to the process.

For example, when a game application is being executed on a main screen in the electronic device 100 and, due to further execution of a video call application by a user, the video call application is being executed, the resource manager 131 may have at least two activated processes, namely, a process 540 corresponding to the game application and a process 550 corresponding to the video call application.

Figure 6:
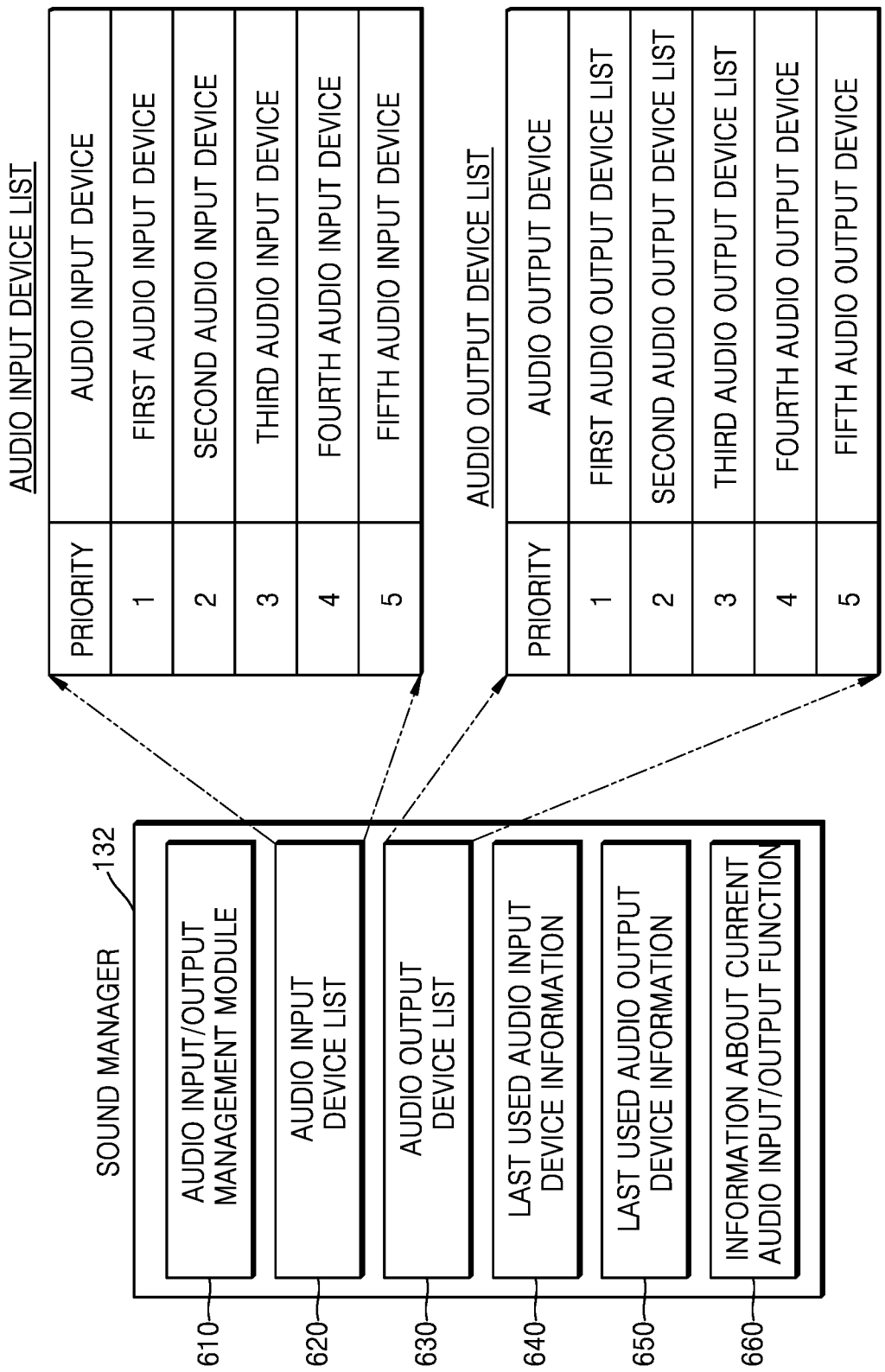
FIG. 6 is a view illustrating an example of a sound manager according to an embodiment of the disclosure.

FIG. 6 is a view illustrating an example of a sound manager according to an embodiment of the disclosure.

Referring to FIG. 6, the sound manager 132 may include an audio input/output management module 610, an audio input device list 620, an audio output device list 630, last used audio input device information 640, and last used audio output device information 650.

The audio input/output management module 610 may include one or more instructions performing an operation disclosed herein, in order to manage an output of audio data that is processed by the electronic device 100 and an input of audio data that is received by the electronic device 100. For example, the audio input/output management module 610 may include one or more instructions performing a portion or the entirety of an operation shown in FIG. 7.

The audio input device list 620 may represent a list of one or more audio input devices. For example, in FIG. 6, the audio input device list 620 may include a first audio input device, a second audio input device, a third audio input device, a fourth audio input device, and a fifth audio input device. The first through fifth audio input devices may include, for example, an audio input device embedded in the electronic device 100 or an audio input device connected to the electronic device 100 by wire or wirelessly to communicate with the electronic device 100, as shown in FIG. 2. The one or more audio input devices included in the audio input device list 620 may be prioritized. The audio input devices may be prioritized according to various criteria. The priorities of the audio input devices may be updated periodically or according to a specific event. The electronic device 100 may refer to the audio input device list 620 stored as described above, in a situation other than a case by a user's selection or a user's request, namely, in a situation in which the electronic device 100 needs to actively select an audio input device.

The audio output device list 630 may represent a list of one or more audio output devices. For example, in FIG. 6, the audio output device list 630 may include a first audio output device, a second audio output device, a third audio output device, a fourth audio output device, and a fifth audio output device. The first through fifth audio output devices may include an audio output device embedded in the electronic device 100 or an audio output device connected to the electronic device 100 by wire or wirelessly to communicate with the electronic device 100, as shown in FIG. 2. The one or more audio output devices included in the audio output device list 630 may be prioritized. The audio output devices may be prioritized according to various criteria. The priorities of the audio output devices may be updated periodically or according to a specific event. The electronic device 100 may refer to the audio output device list 630 stored as described above, in a situation other than a case by a user's selection or a user's request, namely, in a situation in which the electronic device 100 needs to actively select an audio output device.

The audio input devices of an audio input device list and the audio output devices of an audio output device list may be prioritized according to various criteria.

According to an embodiment, the audio input devices of the audio input device list may be prioritized based on the type of application that performs an audio input operation. For example, the first audio input device may have a highest priority for a first application, whereas the second audio input device may have a highest priority for a second application. This will be described in more detail with reference to FIG. 7.

According to an embodiment, the audio input devices of the audio input device list and the audio output devices of the audio output device list may be prioritized based on their own characteristics. For example, the audio input device or audio output device embedded in the electronic device 100 may be set to have a higher priority than the audio input device or audio output device connected via communication. For example, an audio input device or audio output device connected via wired communication may be set to have a higher priority than an audio input device or audio output device connected via wired communication.

According to an embodiment, the audio input devices in the audio input device list and the audio output devices in the audio output device list may be prioritized in the order of having best performance as a result of actually testing performance of the electronic device 100, wherein the testing is performed by the electronic device 100.

According to an embodiment, the audio input devices of the audio input device list and the audio output devices of the audio output device list may be prioritized based on a user input of selecting a priority in correspondence with a graphical user interface provided to allow a user to select a priority.

The last used audio input device information 640 may include information about an audio input device used last by the electronic device 100. The electronic device 100 may refer to the last used audio input device list 640 stored as described above, in a situation other than a case by a user's selection or a user's request, namely, in a situation in which the electronic device 100 needs to actively select an audio input device.

The last used audio input device information 640 may include information about an audio output device used last by the electronic device 100. The electronic device 100 may refer to the last used audio output device list 650 stored as described above, in a situation other than a case by a user's selection or a user's request, namely, in a situation in which the electronic device 100 needs to actively select an audio output device.

Information 660 about a current audio input/output function may include information about an application providing the current audio input/output function or information about a resource providing the current audio input/output function. In detail, the information 660 about the current audio input/output function may include, for example, information about an application providing the current audio input function, information about an audio input device connected via wired and/or wireless communication to provide the current audio input function, information about an application providing the current audio output function, and information about an audio output device connected via wired and/or wireless communication to provide the current audio output function.

Figure 7:
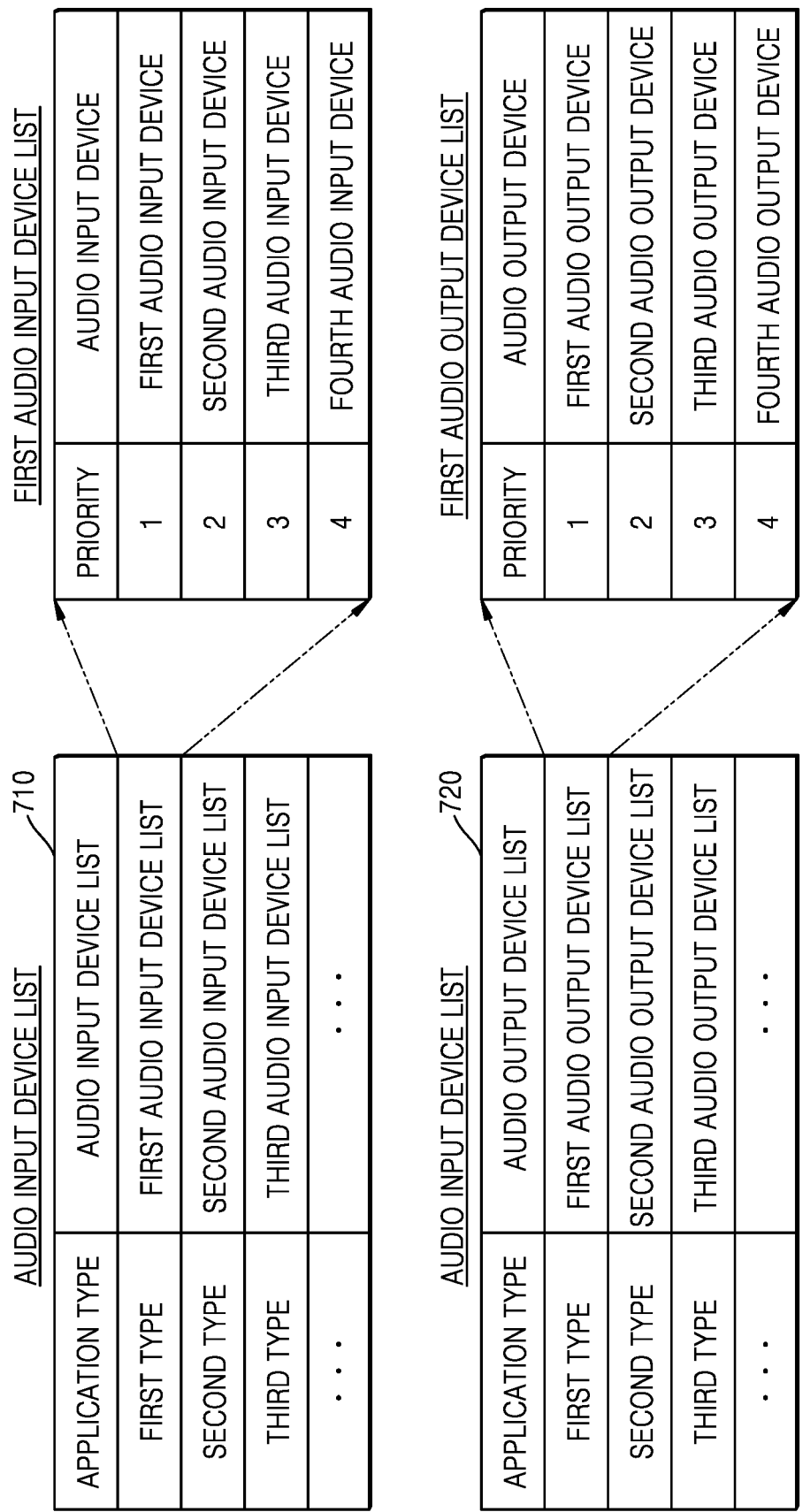
FIG. 7 is a view illustrating an example of an audio input device list including priorities set differently according to types of applications, according to an embodiment of the disclosure.

FIG. 7 is a view illustrating an example of an audio input device list including priorities set differently according to types of applications, according to an embodiment of the disclosure.

Referring to FIG. 7, the audio input device list includes different audio input device lists according to different application types. In detail, a first audio input device list may be registered in correspondence with a first type of application, a second audio input device list may be registered in correspondence with a second type of application, and a third audio input device list may be registered in correspondence with a third type of application. Each audio input device list corresponding to each application may include different audio input devices, and priorities between the audio input devices included in each audio input list may be different. For example, a first audio input device, a second audio input device, a third audio input device, and a fourth audio input device in the first audio input device list may have priorities 1, 2, 3, and 4. The audio input devices included in the second audio input device list or the third audio input device list may be different from the audio input devices included in the first audio input device list, and the priorities thereof may be different therefrom.

The audio output device list includes different audio output device lists according to different application types. In detail, a first audio output device list may be registered in correspondence with the first type of application, a second audio output device list may be registered in correspondence with the second type of application, and a third audio output device list may be registered in correspondence with the third type of application. Each audio output device list corresponding to each application may include different audio output devices, and priorities between the audio output devices included in each list may be different. For example, a first audio output device, a second audio output device, a third audio output device, and a fourth audio output device in the first audio output device list may have priorities 1, 2, 3, and 4. The audio output devices included in the second audio output device list or the third audio output device list may be different from the audio input devices included in the first audio output device list, and the priorities thereof may be different therefrom.

Figure 8:
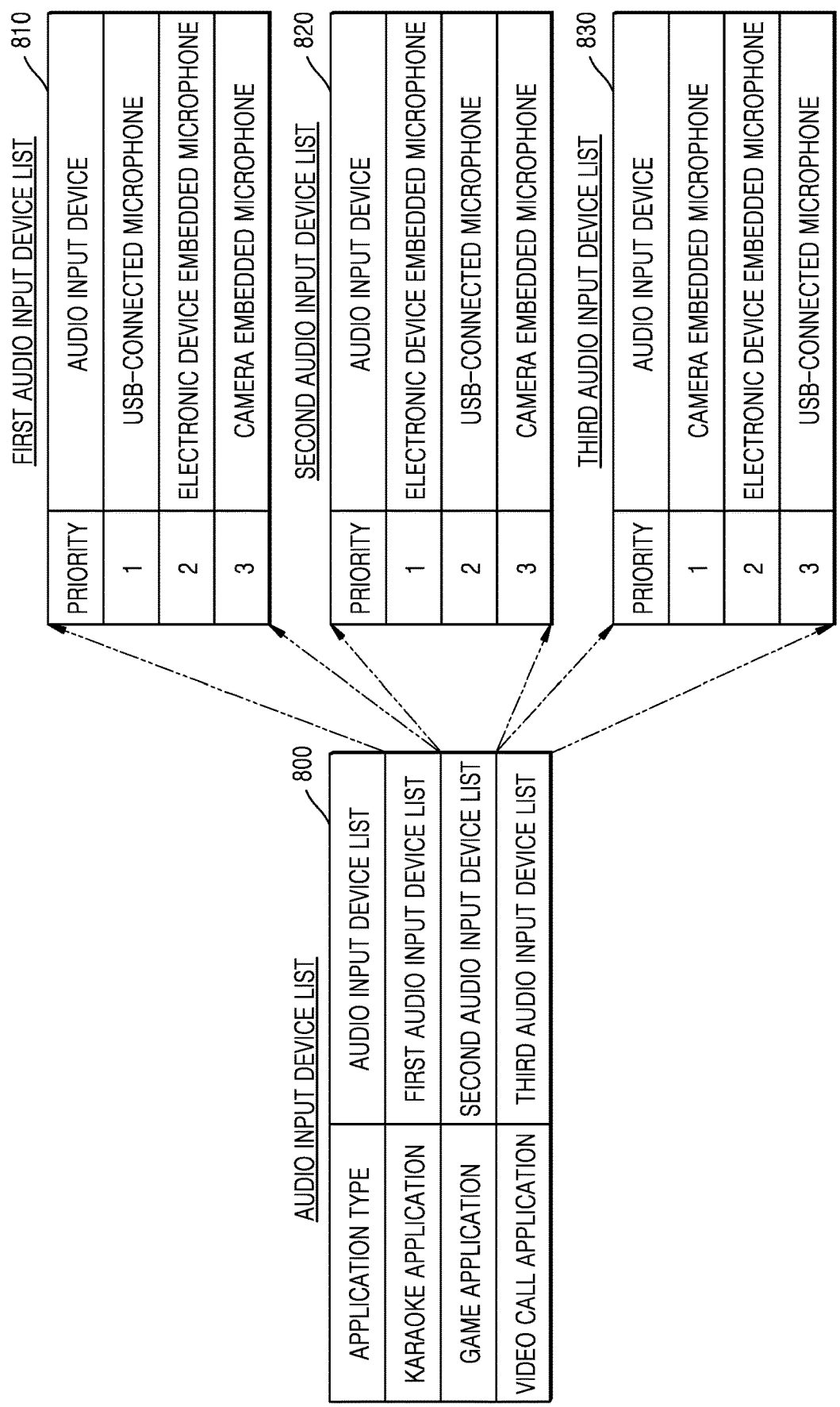
FIG. 8 is a view illustrating an example of an audio input device list including priorities set differently according to types of applications, according to an embodiment of the disclosure.

FIG. 8 is a view illustrating an example of an audio input device list in which priorities are set differently according to types of applications, according to an embodiment of the disclosure.

Referring to FIG. 8, the audio input device list includes corresponding audio input device lists according to a karaoke application, a game application, and a video call application.

In detail, in a first audio input device list registered in correspondence with the karaoke application, a USB connected microphone has a higher priority than an electronic device embedded microphone, and the electronic device embedded microphone has a higher priority than a camera embedded microphone. In the case of a karaoke application operating by receiving a singing sound of a user as an audio input, when wireless connection of an already used audio input device, such as a wirelessly connected headset, is released and the USB-connected microphone capable of more effectively receiving a singing sound of a user has a higher priority than the electronic device embedded microphone, the camera embedded microphone may have a lowest priority due to a security issue or the like because the user is currently not using a camera.

In a second audio input device list registered in correspondence with the game application, the electronic device embedded microphone has a higher priority than the USB connected microphone, and the USB connected microphone has a higher priority than the camera embedded microphone. In the case of a game application operating by receiving a voice of a user as an audio input to perform a voice call function provided by the game application, when wireless connection of an already used audio input device, such as an wirelessly connected headset, is released, the electronic device embedded microphone has a higher priority than the USB-connected microphone, and the camera embedded microphone may have a lowest priority due to a security issue or the like because the user is currently not using a camera.

In a third audio input device list registered in correspondence with the video call application, the camera embedded microphone has a higher priority than the electronic device embedded microphone, and the electronic device embedded microphone has a higher priority than the USB connected microphone. In the case of a video call application operating by receiving a voice of a user as an audio input to perform a voice call function, when wireless connection of an already used audio input device, such as an wirelessly connected headset, is released, a camera has already operated to capture an image of the user according to an operation of the video call application, and thus the camera embedded microphone may have a highest priority. If the USB-connected camera operates to capture an image of a user for an operation of a video call application, the microphone included in a USB-connected camera may be set to have a highest priority.

According to an embodiment, as shown in FIG. 8, the audio input device list in which the audio input devices are prioritized according to an application type may be stored as a default in the electronic device 100.

According to an embodiment, the priority of an audio input device list as shown in FIG. 8 may be updated according to a manual manipulation of a user. For example, the user may change the priorities of the audio input devices included in the audio input device list stored as a default, through a user interface, so that a desired device is selected.

According to an embodiment, the priority of an audio input device list as shown in FIG. 8 may be updated according to an audio input device use history of a user. In detail, the electronic device 100 may monitor a user's preference history of selecting a replacement audio input device when wireless connection of an already wirelessly connected audio input device is released, and may reflect the monitored user's preference history to update the priority of the audio input device list. For example, the electronic device embedded microphone is set as a default to have a highest priority in the second audio input device list corresponding to the game application, but, as a result of monitoring the user's preference history, the user may determine that the frequency of using the USB-connected microphone as the replacement audio input device is high, when the wireless connection of the existing wirelessly connected headset is released. In this case, the electronic device 100 may update the USB-connected microphone to have a highest priority in the second audio input device list corresponding to the game application.

Figure 9:
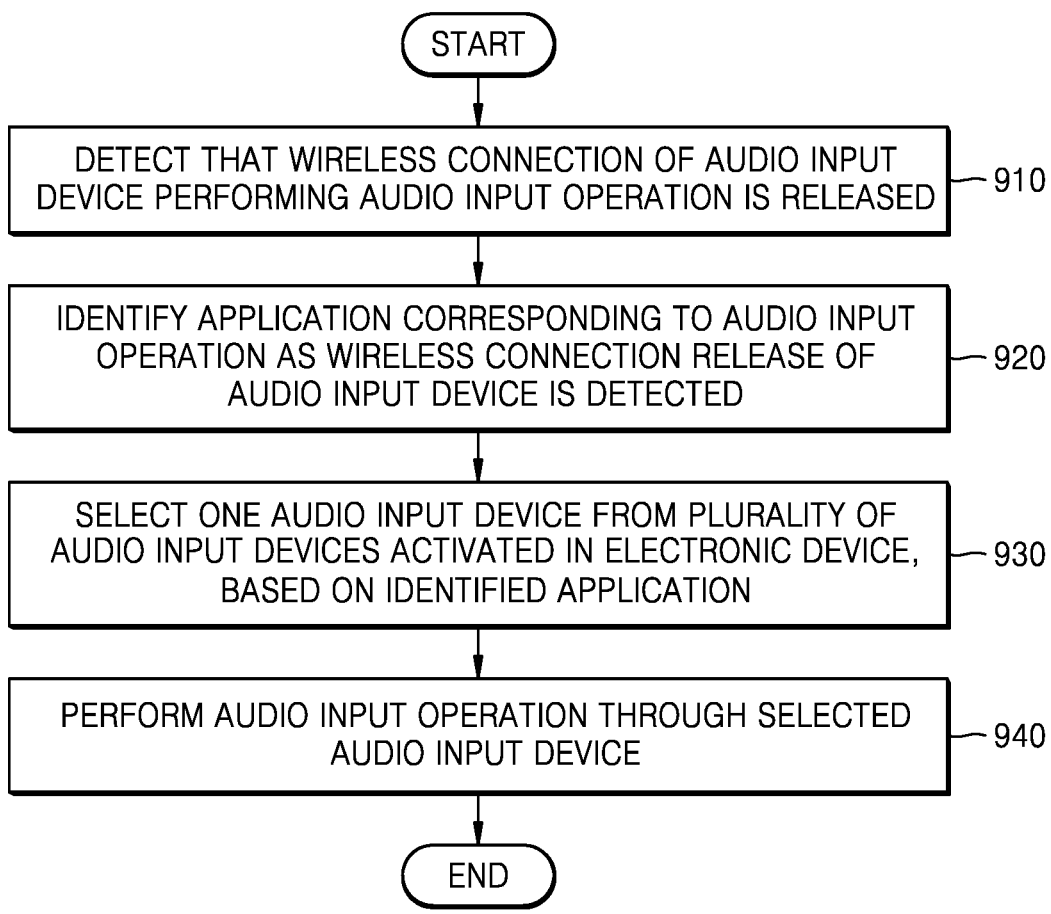
FIG. 9 is a flowchart of an operation method of the electronic device 100 according to an embodiment of the disclosure.

FIG. 9 is a flowchart of an operation method of the electronic device 100 according to an embodiment of the disclosure.

Referring to FIG. 9, in operation 910, the electronic device 100 may detect that wireless connection of an audio input device performing an audio input operation is released. In detail, when an audio input function is included as a function of an application executed by the electronic device 100, the electronic device 100 may wirelessly connect the audio input device thereto to receive an audio input from the connected audio input device and perform the audio input function. For example, when a video call application, a karaoke application, or a voice call application is executed in the electronic device 100, the electronic device 100 may receive an audio input through a wirelessly connected audio input device. The electronic device 100 may receive the audio input through a Bluetooth headset. The electronic device 100 may detect that wireless connection with the wirelessly connected audio input device is released due to various causes of the wirelessly connected audio input device while receiving the audio input from the wirelessly connected audio input device. For example, when the battery of the audio input device is discharged and thus power is off, or in the case of an error operation of the audio input device, or when an error occurs in communication connection with the audio input device, the electronic device 100 may detect that wireless connection of the audio input device is released.

In operation 920, the electronic device 100 may identify an application corresponding to the audio input operation as the wireless connection release of the audio input device is detected.

In other words, because a problem occurs in a function of an audio input device providing a current audio input, the electronic device 100 may select a new audio input device that is to replace a current audio input device, in order to perform an audio input function without any discontinuity. In this case, the electronic device 100 may identify the application providing the current audio input, in order to more adaptively select the replacement audio input device in accordance with a situation where the current audio input function is provided. An application including an audio input function may include, for example, a video call application, a voice call application, a karaoke application, and a game application providing a voice call function.

According to an embodiment, the electronic device 100 may identify the application including an audio input function, by referring to the resource manager 131, as shown in FIG. 5. Because the application that provides the current audio input function is included in information about an activated process, the electronic device 100 may identify the application that provides the current audio input function with reference to the information 500 about the activated process.

According to an embodiment, the electronic device 100 may identify the application including an audio input function, by referring to the sound manager 132, as shown in FIG. 6. The sound manager 132 manages the information 660 about the current audio input/output function. Thus, the electronic device 100 may identify the application providing the current audio input function by referring to the information 660 about the current audio input/output function.

According to an embodiment, the application providing the audio input function may represent an application that is executed in a foreground from among applications currently being executed in the electronic device 100.

In operation 930, the electronic device 100 may select one audio input device from a plurality of audio input devices activated in the electronic device 100, based on the identified application.

As shown in FIG. 8, the electronic device 100 may store an audio input device list corresponding to a corresponding application type for each application type.

According to an embodiment, the electronic device 100 may search for an audio input device list corresponding to the type of the application identified in operation 920, and select one audio input device from a found audio input device list. According to an embodiment, the electronic device 100 may select an audio input device having a highest priority from the audio input device list corresponding to the identified application type. In this case, the electronic device 100 may select an audio input device being in an activated state and having a highest priority from among the audio input devices included in the audio input device list corresponding to the identified application type.

For example, when the application type is a karaoke application, the electronic device 100 may select one audio input device from the first audio input device list as shown in FIG. 8. In this case, the electronic device 100 may select as an audio input device the USB-connected microphone having a highest priority from the first audio input device list. However, when the USB-connected microphone is not in an activated state, namely, when the USB-connected microphone is not connected, the electronic device 100 may select an electronic device embedded microphone having a second highest priority as a new replacement audio input device.

In operation 940, the electronic device 100 may perform an audio input operation through the selected audio input device.

For example, while the electronic device 100 is executing a karaoke application and simultaneously receiving an audio input corresponding to a user's singing sound from the wireless headset, a problem may occur in the wireless headset and thus connection with the wireless headset may be disconnected. In this case, the electronic device 100 may select as the replacement audio input device the USB-connected microphone having a highest priority from the first audio input device list stored in correspondence with the karaoke application type, and may receive an audio input by using the selected USB-connected microphone. Because the electronic device 100 provides such automatic connection, the user may conveniently use a function through the karaoke application without manual setting.

For example, while the electronic device 100 is executing a game application and simultaneously receiving an audio input corresponding to a user's voice utterance from the wireless headset, a problem may occur in the wireless headset, and thus connection with the wireless headset may be disconnected. In this case, the electronic device 100 may select as the replacement audio input device the electronic device embedded microphone having a highest priority from the second audio input device list stored in correspondence with the game application type, and may receive an audio input by using the selected electronic device embedded microphone. Because the electronic device 100 provides such automatic connection, the user may conveniently use a voice call function that is performed within the game application, without manual setting.

Figure 10:
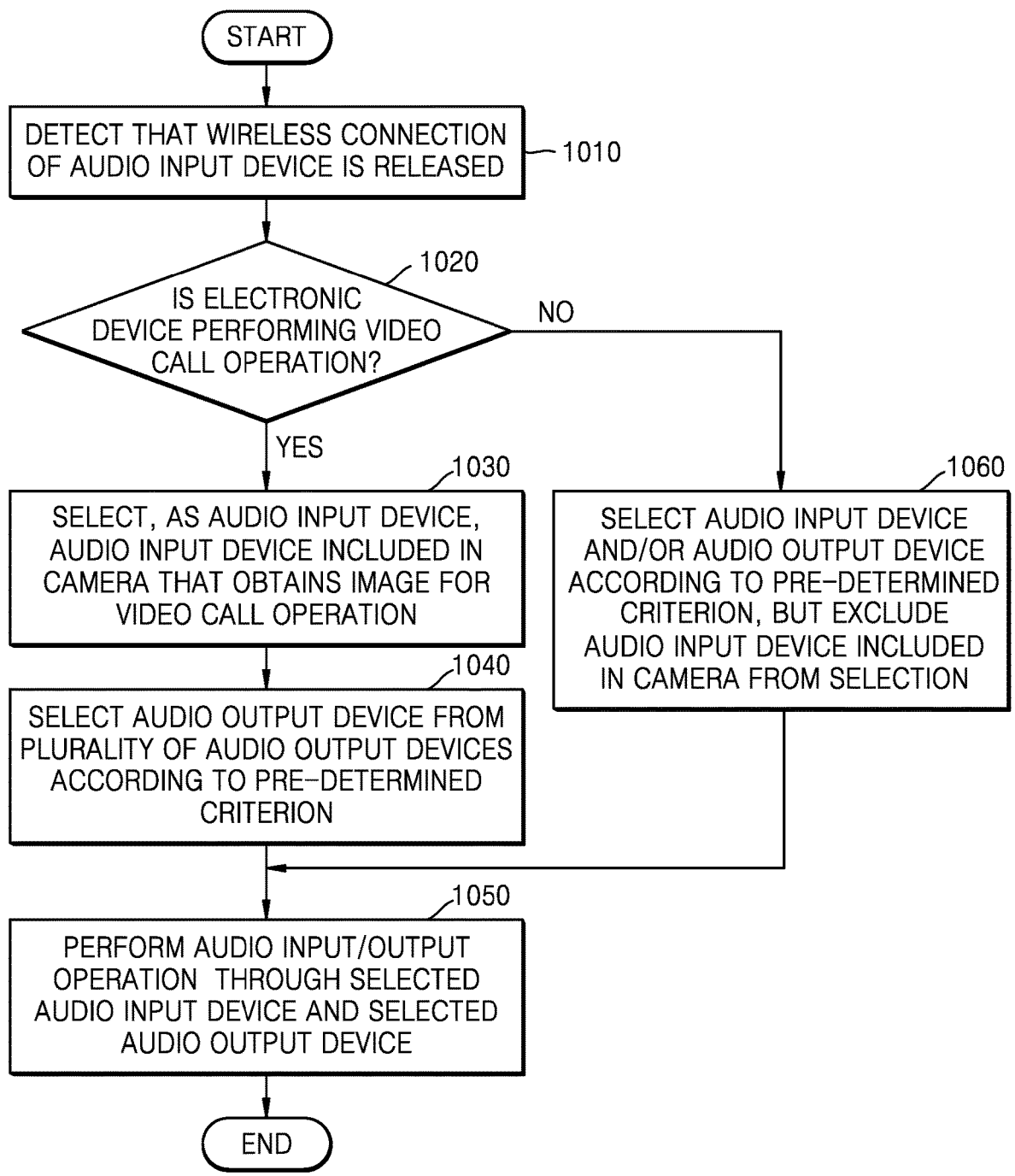
FIG. 10 is a flowchart of an operation method of an electronic device, according to an embodiment of the disclosure.

FIG. 10 is a flowchart of an operation method of an electronic device, according to an embodiment of the disclosure.

Referring to FIG. 10, in operation 1010, the electronic device 100 may detect that wireless connection of an audio input device is released. For example, the electronic device 100 may be connected to a Bluetooth headset using a Bluetooth communication protocol to output audio data or receive audio data from the Bluetooth headset. As described above, the electronic device 100 may detect that, while the electronic device 100 is being connected to and communicating with the Bluetooth headset, the connection with the Bluetooth headset is released.

Disconnection of an audio input/output device may occur due to various causes. For example, the audio input/output device may not operate due to interruption of power supply by the audio input/output device caused when the battery of the audio input/output device is discharged, or communication connection may be released due to a communication error between the electronic device 100 and the audio input/output device.

When communication connection with the audio input/output device is released due to such various causes, the communication interface of the electronic device 100 may detect this communication connection release, and may transmit a signal indicating that communication connection with the audio input/output device has been released to the controller of the electronic device 100, so that the electronic device 100 may detect that communication connection with the audio input/output device has been released. For example, the communication interface may transmit to a sound manager the signal indicating that communication connection with the audio input/output device has been released.

In operation 1020, the electronic device 100 may determine whether the electronic device is performing a video call operation. In detail, as it is detected that wireless connection of an audio input device is released, the electronic device 100 may determine whether the video call operation is being performed in the electronic device 100. The determination as to whether the electronic device 100 is performing the video call operation may be made by checking whether the video call operation is being performed in the electronic device 100. For example, the resource manager may manage information about one or more applications being executed in the electronic device 100. Thus, the sound manager may determine whether the video call application is being executed, by checking the information on one or more applications managed by the resource manager. When it is determined in operation 1020 that the video call operation is being executed, the method may proceed to operation 1030.

In operation 1030, the electronic device 100 may select as an audio input device an audio input device included in a camera that obtains an image for the video call operation.

When a wirelessly connected audio input/output device used for an audio input/output operation is disconnected, the electronic device 100 needs to search for an audio input/output device to replace the audio input/output device and immediately connect a found audio input/output device so that the electronic device 100 may provide audio data to the user without any discontinuity or receive a voice of the user from the user without any discontinuity. At this time, when the video call operation is being executed, namely, when call data is being transmitted or received through the audio input/output device, the electronic device 100 may select the voice input device included in an already activated camera as the audio input device. For example, the sound manager may select a microphone included in the camera as the audio input device.

The camera through which the electronic device 100 obtains an image for a video call operation is not necessarily limited to a camera built in the electronic device 100, and the camera through which the electronic device 100 obtains an image for a video call operation may be a USB-connected camera or any other wirelessly connected camera.

In operation 1040, the electronic device 100 may select an audio output device from the plurality of audio output devices according to a pre-determined criterion. The pre-determined criterion for selecting one audio output device from the plurality of audio output devices may be determined according to various ways.

According to an embodiment, the electronic device 100 may select an audio output device, based on the last used audio output device information 650. In detail, the sound manager 152 may select an audio output device registered in the last used audio output device information 650. When an electronic device embedded speaker has been registered in the last used audio output device information 650, the sound manager 152 may select the electronic device embedded speaker as the audio output device.

According to an embodiment, the electronic device 100 may select the audio output device according to the priority of the audio output device list.

According to an embodiment, the electronic device 100 may previously store a list of one or more audio output devices embedded in the electronic device 100 and/or one or more audio output devices connectable to the electronic device 100.

According to an embodiment, the electronic device 100 may prioritize the one or more audio output devices in the list of the audio output devices and may store the prioritized one or more audio output devices. The electronic device 100 may prioritize the audio input devices or the audio output devices according to various criteria.

According to an embodiment, the electronic device 100 may select an audio output device from the prioritized list according to a pre-determined priority.

FIG. 11 illustrates an example of a prioritized audio input device list and an example of a prioritized audio output device list, according to an embodiment of the disclosure.

Referring to FIG. 11, the audio input device list 620 may include an electronic device embedded microphone having priority 1, a USB-connected external microphone having priority 2, a microphone of an electronic device remote controller having priority 3, a microphone of an electronic device connected smart device having priority 4, and an electronic device embedded webcam microphone having priority 5.

The audio output device list 630 may include an electronic device embedded speaker having priority 1, a sound bar having priority 2, a USB connected speaker having priority 3, a Bluetooth connected speaker having priority 4, and a Bluetooth connected smartphone having priority 5. The electronic device 100 may select, as an audio output device, the electronic device embedded speaker having priority 1, which is a highest priority, from the prioritized audio output device list 630.

According to an embodiment, the electronic device 100 may select an audio output device from the prioritized list according to a pre-determined priority, but may further consider whether each audio output device is activated. The one or more audio output devices included in the audio output device list may be in an activated state or in an inactivated state. The activated state may indicate a state in which the audio output device is able to receive audio data and immediately output the audio data. The inactivated state may indicate a state in which the audio output device is unable to receive audio data and immediately output the audio data. For example, the inactivated state may indicate a state in which the audio output device is not connected to the electronic device 100 or a state in which the audio output device does not properly operate. The audio output device list may be prioritized by the electronic device 100 according to a certain criterion and be stored, but, when the audio output device is in an inactivated state, this indicates that the audio output device is not available, and thus this audio output device may be excluded from selection.

FIG. 12 illustrates an embodiment in which an audio input device list and an audio output device list further include information indicating whether each device is activated, according to an embodiment of the disclosure.

Referring to FIG. 12, an audio input device list 620 may include a USB-connected external microphone having priority 1, an electronic device embedded microphone having priority 2, a microphone of an electronic device remote controller having priority 3, a microphone of an electronic device connected smart device having priority 4, and an electronic device embedded webcam microphone having priority 5. Activation or inactivation information of the USB-connected external microphone having priority 1 and the electronic device embedded webcam microphone having priority 5 indicates inactivation, and activation or inactivation information of the other audio input devices indicates activation.

An audio output device list 1220 may include a sound bar having priority 1, an electronic device embedded speaker having priority 2, a USB connected speaker having priority 3, a Bluetooth connected speaker having priority 4, and a Bluetooth connected smartphone having priority 5. Activation or inactivation information of the sound bar having priority 1 and the USB connected speaker having priority 3 indicates inactivation, and activation or inactivation information of the other audio output devices indicates activation.

When the electronic device 100 selects an audio output device from the audio output device list 1220 according to priority, the electronic device 100 selects the sound bar having priority 1, but, when further considering activation or inactivation information, the electronic device 100 may select, as the audio output device, the electronic device embedded speaker having priority 2, which is next to priority 1, and being in an activated state, instead of the sound bar having priority 1 and being in an inactivated state.

In operation 1050, the electronic device 100 may perform an audio input/output operation through the selected audio input device and the selected audio output device. For example, when the microphone of a camera is selected as the audio input device in operation 1030 and a speaker embedded in the electronic device 100 is selected as the audio output device in operation 1040, the electronic device 100 may control a voice of a user to be received through the camera microphone and audio data to be output through the speaker embedded in the electronic device 100.

When it is determined in operation 1020 that the video call operation is not being executed, the method may proceed to operation 1060.

In operation 1060, the electronic device 100 may select the audio input device and the audio output device according to a pre-determined criterion, but a voice input device included in the camera may be excluded from the selection.

The electronic device 100 may select the audio input device from the audio input device list according to a pre-determined priority. The electronic device 100 may select the audio output device from the audio output device list according to a pre-determined priority. However, because the electronic device 100 is not currently using the camera, the electronic device 100 may set a limit not to select the voice input device included in the camera device. Cameras are generally related to security issues, so users may not want a camera to operate in situations where they do not directly select the camera. In other words, because users do not want the camera to be activated and capture users' images regardless of their intentions, the electronic device 100 takes this into consideration to prevent the camera from being activated due to selection by the electronic device 100, when the current camera is not in an activated state.

In operation 1060, the electronic device 100 may select an audio input device from the plurality of audio input devices according to a pre-determined criterion. The pre-determined criterion for selecting one audio input device from the plurality of audio input devices may be determined according to various ways.

According to an embodiment, the electronic device 100 may select an audio input device, based on the last used audio input device information 640. In detail, the sound manager 152 may select an audio input device registered in the last used audio input device information 640. When a USB connected microphone has been registered in the last used audio input device information 640, the sound manager 152 may select the USB connected microphone as the audio input device.

According to an embodiment, the electronic device 100 may select the audio input device according to the priority of the audio input device list.

According to an embodiment, the electronic device 100 may prioritize the one or more audio input devices in the list of the audio input devices and may store the prioritized one or more audio input devices. The electronic device 100 may prioritize the audio input devices or the audio output devices according to various criteria.

According to an embodiment, the electronic device 100 may select an audio input device from the prioritized list according to a pre-determined priority.

Referring to FIG. 11, the audio input device list 620 may include an electronic device embedded microphone having priority 1, a USB-connected external microphone having priority 2, a microphone of an electronic device remote controller having priority 3, a microphone of an electronic device connected smart device having priority 4, and an electronic device embedded webcam microphone having priority 5. The electronic device 100 may select, as an audio input device, the electronic device embedded microphone having priority 1, which is a highest priority, from the prioritized audio input device list 620.

According to an embodiment, the electronic device 100 may select an audio input device from the prioritized list according to a pre-determined priority, but may further consider whether each audio input device is activated. The one or more audio input devices included in the audio input device list may be in an activated state or in an inactivated state. The activated state may indicate a state in which the audio input device is able to receive audio data and immediately output the audio data. The inactivated state may indicate a state in which the audio input device is unable to receive audio data and immediately output the audio data. For example, the inactivated state may indicate a state in which the audio input device is not connected to the electronic device 100 or a state in which the audio input device does not properly operate. The audio input device list may be prioritized by the electronic device 100 according to a certain criterion and be stored, but, when the audio input device is in an inactivated state, this indicates that the audio input device is not available, and thus this audio input device may be excluded from selection.

Referring to FIG. 12, the audio input device list 1210 may include a USB-connected external microphone having priority 1, an electronic device embedded microphone having priority 2, a microphone of an electronic device remote controller having priority 3, a microphone of an electronic device connected smart device having priority 4, and an electronic device embedded webcam microphone having priority 5. Activation or inactivation information of the USB-connected external microphone having priority 1 and the electronic device embedded webcam microphone having priority 5 indicates inactivation, and activation or inactivation information of the other audio input devices indicates activation.

When the electronic device 100 selects an audio input device from the audio input device list 1210 according to priority, the electronic device 100 selects the USB-connected external microphone having priority 1, but, when further considering activation or inactivation information, the electronic device 100 may select, as the audio output device, the electronic device embedded microphone having priority 2, which is next to priority 1, and being in an activated state, instead of the USB-connected external microphone having priority 1 and being in an inactivated state.

Because an audio output device is the same as described in operation 1040, further description thereof is omitted.

Figure 13:
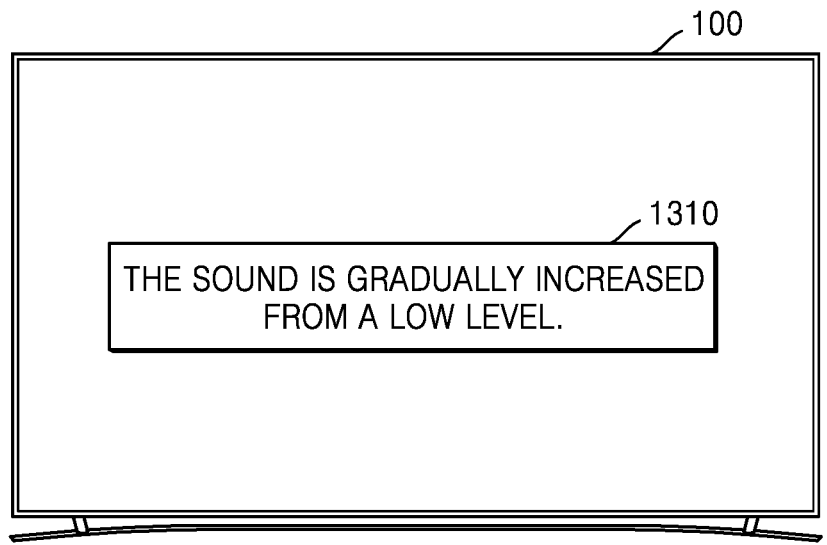
FIG. 13 illustrates an example of a graphical user interface informing that an audio volume is gradually increased, according to an embodiment of the disclosure.

When connection of an audio input/output device in the electronic device 100 is released and thus a new audio input/output device replacing the existing audio input/output device is selected, because the audio input device functions to receive sound, there may be little possibility that a user is affected by an operation parameter of the audio input device. However, the audio output device relates to a function of outputting sound, and thus there may be a high possibility of being affected by an operation parameter of the audio output device according to the type of the audio output device. In other words, a volume level previously set by a user may not be in an optimized state for an audio function that is conducted in the electronic device 100. For example, the user may set the volume to 20 while watching a broadcast program through the electronic device 100. In addition, when the user plays game content through the current electronic device 100, the user may set a higher volume to listen to audio through the Bluetooth headset. In such a situation, when connection of the Bluetooth headset is released and thus a replacement audio output device is selected and outputs audio, if a user maintains an already-set audio volume to listen to the audio through the Bluetooth headset, too loud sound may be suddenly output through the speaker of the electronic device 100. To prevent this problem, when the connection of the Bluetooth headset is released while the Bluetooth headset personally listening to sound is being used, the electronic device 100 may temporarily lower the sound and then gradually increase the audio volume when outputting audio to the replacement audio output device. In order to explain such a situation to the user, the electronic device 100 may output a message 1310 stating <The sound is gradually increased from a low level> as shown in FIG. 13. FIG. 13 illustrates an example of a graphical user interface informing that an audio volume is gradually increased, according to an embodiment of the disclosure. Alternatively, when outputting audio to a replacement audio output device, the electronic device 100 may output a graphic user interface that allows a user to adjust the audio volume, to receive an input for adjusting the volume from the user and output audio with a volume suitable for the user.

According to an embodiment, when connection of an audio input/output device in the electronic device 100 is released and thus a new audio input/output device replacing the existing audio input/output device is selected, the electronic device 100 may output a graphical user interface that allows the user to select a replacement audio output device instead of selecting an audio output device according to the internal settings of the electronic device 100.

Figure 14:
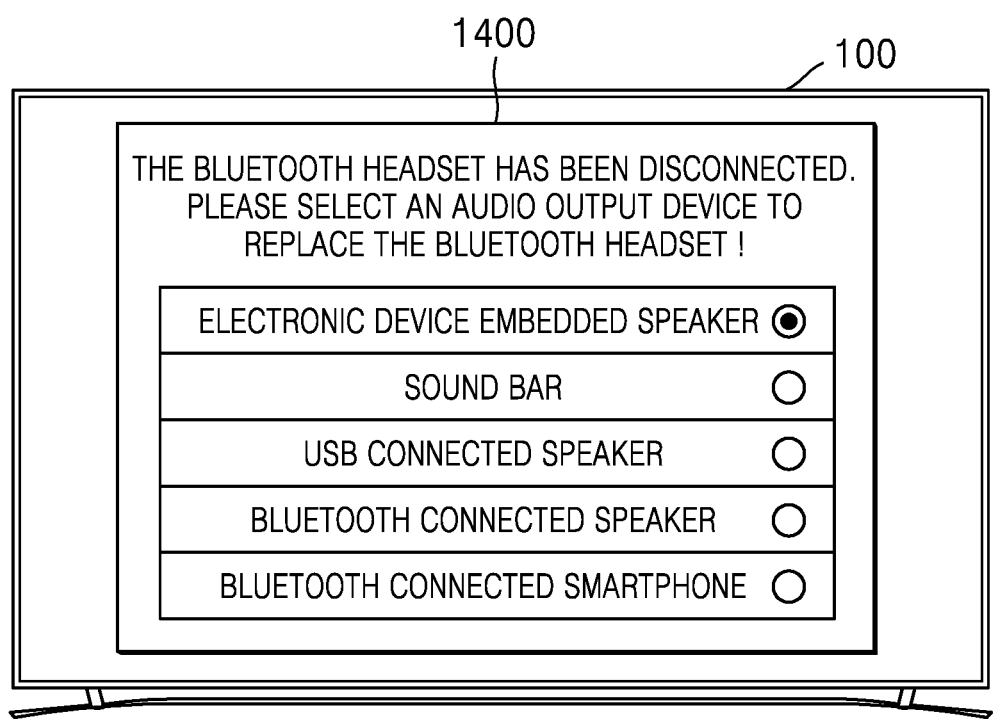
FIG. 14 illustrates an example of a graphical user interface allowing a user to select a replacement audio output device, according to an embodiment of the disclosure.

FIG. 14 illustrates an example of a graphical user interface allowing a user to select a replacement audio output device, according to an embodiment of the disclosure.

Referring to FIG. 14, when connection of an audio input/output device in the electronic device 100 is released and thus a new audio input/output device replacing the existing audio input/output device needs to be selected, the electronic device 100 may output a graphical user interface 1400 allowing a user to select the replacement audio output device. The graphical user interface 1100 may provide a menu for selecting an electronic device embedded speaker, a sound bar, a USB-connected speaker, a Bluetooth-connected speaker, or a Bluetooth-connected smartphone, together with a message <The Bluetooth headset has been disconnected. Please select an audio output device to replace the Bluetooth headset!>.

Some embodiments may also be embodied as a storage medium including instruction codes executable by a computer such as a program module executed by the computer. A computer readable medium can be any available medium which can be accessed by the computer and includes all volatile/non-volatile and removable/non-removable media. Computer-readable media may also include computer storage media. The computer storage medium includes all volatile/non-volatile and removable/non-removable media embodied by a certain method or technology for storing information such as computer readable instruction code, a data structure, a program module or other data.

The disclosed embodiments may be implemented as an S/W program including instructions stored in computer-readable storage media.

A computer is a device capable of calling stored instructions from a storage medium and operating according to the disclosed embodiments according to the called instructions, and may include the electronic devices according to the disclosed embodiments.

The computer-readable storage medium may be provided as a non-transitory storage medium. Here, 'non-transitory' means that the storage medium does not include a signal and is tangible, but does not distinguish whether data is stored semi-permanently or temporarily in the storage medium.

Control methods according to disclosed embodiments may be provided in a computer program product. Computer program products are commodities and thus may be traded between sellers and buyers.

The computer program product may include a software program and a computer-readable storage medium having the software program stored thereon. For example, the computer program product may include a product in the form of a software program (e.g., a downloadable app) that is electronically distributed through the manufacturer of a device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program products may include, in a system including a server and a device, a storage medium of the server or a storage medium of the device. Alternatively, if there is a third device (e.g., a smartphone) in communication with the server or device, the computer program product may include a storage medium of the third device. Alternatively, the computer program product may include the software program itself transmitted from the server to the device or the third device, or transmitted from the third device to the device.

In this case, one of the server, the device, and the third device may execute the computer program product to perform the methods according to the disclosed embodiments. Alternatively, at least two of the server, the device, and the third device may execute the computer program product to distribute and perform the methods according to the disclosed embodiments.

For example, a server (e.g., a cloud server or an AI server) may execute a computer program product stored on a server to control a device communicating with the server to perform the methods according to the disclosed embodiments.

As another example, a third device may execute a computer program product to control a device in communication with the third device to perform the methods according to the disclosed embodiments. When the third device executes the computer program product, the third device may download the computer program product from the server and execute the downloaded computer program product. Alternatively, the third device may execute a computer program product provided in a preloaded state to perform methods according to the disclosed embodiments.

The terminology "~unit" used herein may be a hardware component such as a processor or a circuit, and/or a software component that is executed by a hardware component such as a processor.

While the disclosure has been particularly shown and described with reference to exemplary embodiments thereof, it will be understood that various changes in form and details may be made therein without departing from the spirit and scope of the disclosure. Thus, the above-described embodiments should be considered in descriptive sense only and not for purposes of limitation. For example, each component described as a single type may be implemented in a distributed manner, and similarly, components described as being distributed may be implemented in a combined form.

The scope of the disclosure is indicated by the scope of the claims to be described later rather than the above detailed description, and all changes or modified forms derived from the meaning and scope of the claims and the concept of equivalents thereof should be interpreted as being included in the scope of the disclosure.

The invention claimed is:

1. An electronic device comprising:
   a communication interface;
   a memory to store one or more instructions; and
   a processor configured to execute the one or more instructions stored in the memory to:
   receive an audio input through the communication interface from an audio input device,
   detect a release of a wireless connection through the communication interface while an audio input operation is being performed through the communication interface,
   based on the release of the wireless connection through the communication interface identify whether the electronic device is performing a video call application using the audio input device,
   based on the electronic device performing the video call application, select as a replacement audio input device an audio input device included in a camera that obtains an image for the video call application,
   based on the electronic device not performing the video call application, select the replacement audio input device from a plurality of audio input devices based on a specified criterion, and
   perform the audio input operation through the selected replacement audio input device.

2. The electronic device of claim 1, wherein based on the electronic device not performing the video call application, the audio input device included in the camera is excluded from being selected as the replacement audio input device to prevent the camera from being activated.

3. The electronic device of claim 1, wherein the video call application corresponding to the audio input operation is currently running in a foreground among one or more applications currently running in the electronic device.

4. An operation method of an electronic device, the operation method comprising:
   receiving an audio input through a communication interface from an audio input device;
   detecting a release of a wireless connection through the communication interface while an audio input operation is being performed through the communication interface;
   based on the release of the wireless connection through the communication interface, identifying whether the electronic device is performing a video call application using the audio input device;
   based on the electronic device performing the video call application, selecting as a replacement audio input device an audio input device included in a camera that obtains an image for the video call application;
   based on the electronic device not performing the video call application, selecting the replacement audio input device from a plurality of audio input devices based on a specified criterion; and
   performing the audio input operation through the selected replacement audio input device.

5. The operation method of claim 4, wherein based on the electronic device not performing the video call application, the audio input device included in the camera is excluded from being selected as the replacement audio input device to prevent the camera from being activated.

6. The operation method of claim 4, wherein the video call application corresponding to the audio input operation is currently running in a foreground among one or more applications currently running in the electronic device.

7. A non-transitory computer-readable recording medium having recorded thereon one or more programs executable by a processor of an electronic device to implement an operation method of the electronic device, the operation method of the electronic device comprising:
   receiving an audio input through a communication interface from an audio input device;
   detecting a release of a wireless connection through the communication interface while an audio input operation is being performed through the communication interface;
   based on the release of the wireless connection through the communication interface, identifying whether the electronic device is performing a video call application using the audio input device;

based on the electronic device performing the video call application, selecting as a replacement audio input device an audio input device included in a camera that obtains an image for the video call application, based on the electronic device not performing the video call application, selecting the replacement audio input device from a plurality of audio input devices based on a specified criterion; and performing the audio input operation through the selected replacement audio input device.

* * * * *